US007563163B2

(12) United States Patent
Crumby

(10) Patent No.: US 7,563,163 B2
(45) Date of Patent: Jul. 21, 2009

(54) GAMING DEVICE INCLUDING OUTCOME POOLS FOR PROVIDING GAME OUTCOMES

(75) Inventor: Hardy L. Crumby, Reno, NV (US)

(73) Assignee: IGT, Reno, NV (US)

( * ) Notice: Subject to any disclaimer, the term of this patent is extended or adjusted under 35 U.S.C. 154(b) by 564 days.

(21) Appl. No.: 10/261,744

(22) Filed: Oct. 1, 2002

(65) Prior Publication Data

US 2004/0063489 A1 Apr. 1, 2004

(51) Int. Cl.
*A63F 3/06* (2006.01)
*A63F 13/10* (2006.01)
*A63F 13/00* (2006.01)

(52) U.S. Cl. .............................. 463/17; 463/16; 463/18; 463/19; 463/20; 463/21; 463/22; 463/23

(58) Field of Classification Search .................. 463/20, 463/16–19, 25, 11–13, 21–23; 273/269, 273/270, 292, 148 R, 149 R, 149 P, 148 B; 283/49, 903, 50, 1 B; 235/1 B, 78 G, 88 G, 235/61 G, 90; 340/323 R, 323 B; 700/91–93; 377/4, 5; 708/250–256

See application file for complete search history.

(56) References Cited

U.S. PATENT DOCUMENTS 4,332,389 A 6/1982 Loyd et al.
4,365,810 A 12/1982 Richardson
4,373,726 A 2/1983 Churchill et al.
4,448,419 A 5/1984 Telnaes
4,455,025 A 6/1984 Itkis
4,494,197 A 1/1985 Troy et al.
4,527,798 A 7/1985 Siekierski et al.
4,582,324 A * 4/1986 Koza et al. .................... 463/16
4,624,462 A 11/1986 Itkis
4,636,951 A 1/1987 Harlick
4,652,998 A 3/1987 Koza et al.
4,669,730 A 6/1987 Small
4,679,143 A 7/1987 Hagiwara
4,689,742 A 8/1987 Troy et al.

(Continued)

FOREIGN PATENT DOCUMENTS

EP 0 945 837 A2 * 9/1999

(Continued)

OTHER PUBLICATIONS

Randall, et al., Apparatus and Method for Game Play in an Electronic Environment, Oct. 30, 2003, PCT/US03/10082, WO 03/089074.*

(Continued)

*Primary Examiner*—Peter DungBa Vo
*Assistant Examiner*—Matthew D. Hoel
(74) *Attorney, Agent, or Firm*—K&L Gates LLP

(57) ABSTRACT

A gaming device which includes one or more outcome pools for providing outcomes to players. After a predetermined event occurs, the gaming device processor draws one or more outcomes from one or more pools. The gaming device provides the drawn outcomes to a player and prevents the drawn outcomes from being provided to any player again until the processor has provided players with all of the outcomes remaining in the pools of the drawn outcomes.

65 Claims, 19 Drawing Sheets

U.S. PATENT DOCUMENTS

| | | | | |
|---|---|---|---|---|
| 4,798,387 | A | 1/1989 | Richardson | |
| 4,815,741 | A | 3/1989 | Small | |
| 4,842,278 | A | 6/1989 | Markowicz | |
| 4,848,771 | A | 7/1989 | Richardson | |
| 4,856,787 | A | 8/1989 | Itkis | |
| 4,880,237 | A | 11/1989 | Kishishita | |
| 4,882,473 | A | 11/1989 | Bergeron et al. | |
| 5,000,453 | A * | 3/1991 | Stevens et al. | 273/149 R |
| 5,007,649 | A | 4/1991 | Richardson | |
| 5,042,809 | A * | 8/1991 | Richardson | 463/18 |
| 5,092,598 | A | 3/1992 | Kamille | |
| 5,100,139 | A | 3/1992 | Di Bella | |
| 5,119,295 | A | 6/1992 | Kapur | |
| 5,158,293 | A | 10/1992 | Mullins | |
| 5,223,698 | A | 6/1993 | Kapur | |
| 5,275,400 | A | 1/1994 | Weingardt et al. | |
| 5,297,802 | A | 3/1994 | Pocock et al. | |
| 5,324,035 | A * | 6/1994 | Morris et al. | 463/42 |
| 5,326,104 | A | 7/1994 | Pease et al. | |
| 5,348,299 | A | 9/1994 | Clapper, Jr. | |
| 5,351,970 | A | 10/1994 | Fioretti | |
| 5,377,975 | A | 1/1995 | Clapper, Jr. | |
| 5,393,061 | A | 2/1995 | Manship et al. | |
| 5,407,199 | A | 4/1995 | Gumina | |
| 5,476,259 | A | 12/1995 | Weingardt | |
| 5,487,544 | A | 1/1996 | Clapper, Jr. | |
| 5,536,008 | A | 7/1996 | Clapper, Jr. | |
| 5,542,669 | A | 8/1996 | Charron et al. | |
| 5,562,284 | A | 10/1996 | Stevens | |
| 5,564,701 | A | 10/1996 | Dettor | |
| 5,580,311 | A | 12/1996 | Haste, III | |
| 5,586,937 | A | 12/1996 | Menashe | |
| 5,595,538 | A | 1/1997 | Haste, III | |
| 5,609,337 | A | 3/1997 | Clapper, Jr. | |
| 5,628,684 | A | 5/1997 | Bouedec | |
| 5,630,754 | A | 5/1997 | Rebane | |
| 5,645,485 | A | 7/1997 | Clapper, Jr. | |
| 5,657,899 | A | 8/1997 | Stoken | |
| 5,697,843 | A | 12/1997 | Manship et al. | |
| 5,720,483 | A | 2/1998 | Trinh | |
| 5,735,432 | A | 4/1998 | Stoken et al. | |
| 5,749,784 | A | 5/1998 | Clapper, Jr. | |
| 5,779,545 | A | 7/1998 | Berg et al. | |
| 5,779,547 | A | 7/1998 | SoRelle et al. | |
| 5,810,664 | A | 9/1998 | Clapper, Jr. | |
| 5,830,067 | A | 11/1998 | Graves et al. | |
| 5,855,515 | A | 1/1999 | Pease et al. | |
| 5,871,398 | A | 2/1999 | Schneier et al. | |
| 5,876,283 | A | 3/1999 | Parra et al. | |
| 5,882,260 | A | 3/1999 | Marks et al. | |
| 5,915,588 | A | 6/1999 | Stoken et al. | |
| 5,928,082 | A | 7/1999 | Clapper, Jr. | |
| 5,941,771 | A | 8/1999 | Haste, III | |
| 5,944,606 | A | 8/1999 | Gerow | |
| 5,949,042 | A | 9/1999 | Dietz, II et al. | |
| 5,970,143 | A | 10/1999 | Schneier et al. | |
| 5,980,385 | A | 11/1999 | Clapper, Jr. | |
| 5,984,779 | A | 11/1999 | Bridgeman et al. | |
| 6,012,984 | A | 1/2000 | Roseman | |
| 6,017,032 | A * | 1/2000 | Grippo et al. | 273/138.1 |
| 6,024,640 | A | 2/2000 | Walker et al. | |
| 6,056,289 | A | 5/2000 | Clapper, Jr. | |
| 6,062,981 | A | 5/2000 | Luciano, Jr. | |
| 6,079,711 | A | 6/2000 | Wei et al. | |
| 6,093,100 | A | 7/2000 | Singer et al. | |
| 6,099,408 | A * | 8/2000 | Schneier et al. | 463/29 |
| 6,117,009 | A * | 9/2000 | Yoseloff | 463/20 |
| 6,120,024 | A | 9/2000 | Lind | |
| 6,155,925 | A | 12/2000 | Giobbi et al. | |
| 6,159,095 | A | 12/2000 | Frohm et al. | |
| 6,174,233 | B1 | 1/2001 | Sunaga et al. | |
| 6,183,361 | B1 | 2/2001 | Cummings et al. | |
| 6,210,275 | B1 | 4/2001 | Olsen | |
| 6,210,276 | B1 | 4/2001 | Mullins | |
| 6,217,448 | B1 | 4/2001 | Olsen | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,254,480 | B1 | 7/2001 | Zach | |
| 6,280,325 | B1 | 8/2001 | Fisk | |
| 6,302,791 | B1 | 10/2001 | Frohm et al. | |
| 6,306,038 | B1 | 10/2001 | Graves et al. | |
| 6,309,298 | B1 | 10/2001 | Gerow | |
| 6,315,289 | B1 | 11/2001 | Sakamoto et al. | |
| 6,358,150 | B1 | 3/2002 | Mir et al. | |
| 6,358,151 | B1 | 3/2002 | Enzminger et al. | |
| 6,386,977 | B1 | 5/2002 | Hole | |
| 6,402,614 | B1 * | 6/2002 | Schneier et al. | 463/17 |
| 6,419,583 | B1 | 7/2002 | Crumby et al. | |
| 6,443,837 | B1 | 9/2002 | Jaffe et al. | |
| 6,447,395 | B1 | 9/2002 | Stevens | |
| 6,471,591 | B1 | 10/2002 | Crumby | |
| 6,524,185 | B2 | 2/2003 | Lind | |
| 6,565,092 | B1 * | 5/2003 | McCarthy, Jr. | 273/292 |
| 6,569,017 | B2 | 5/2003 | Enzminger et al. | |
| 6,599,187 | B2 | 7/2003 | Gerow | |
| 6,656,040 | B1 | 12/2003 | Brosnan et al. | |
| 6,656,044 | B1 | 12/2003 | Lewis | |
| 6,729,961 | B1 | 5/2004 | Millerschone | |
| 6,749,500 | B1 | 6/2004 | Nelson et al. | |
| 2002/0025845 | A1 * | 2/2002 | Cannon | 463/16 |
| 2002/0025846 | A1 * | 2/2002 | Bennett et al. | 463/20 |
| 2002/0039917 | A1 * | 4/2002 | Armstrong et al. | 463/16 |
| 2002/0072404 | A1 * | 6/2002 | Gerow | 463/27 |
| 2002/0077173 | A1 | 6/2002 | Luciano et al. | |
| 2002/0077174 | A1 | 6/2002 | Luciano et al. | |
| 2002/0082070 | A1 * | 6/2002 | Macke et al. | 463/16 |
| 2002/0082071 | A1 | 6/2002 | Riendeau et al. | |
| 2002/0082085 | A1 | 6/2002 | Osterer | |
| 2002/0090986 | A1 | 7/2002 | Cote et al. | |
| 2002/0094871 | A1 | 7/2002 | Luciano, Jr. et al. | |
| 2002/0098882 | A1 * | 7/2002 | Lind et al. | 463/17 |
| 2002/0111207 | A1 | 8/2002 | Lind et al. | |
| 2002/0111214 | A1 | 8/2002 | Lind et al. | |
| 2002/0113369 | A1 | 8/2002 | Weingardt | |
| 2002/0132661 | A1 | 9/2002 | Lind et al. | |
| 2002/0132666 | A1 | 9/2002 | Lind et al. | |
| 2002/0169018 | A1 | 11/2002 | Schneier et al. | |
| 2003/0100371 | A1 | 5/2003 | Gatto et al. | |
| 2003/0100372 | A1 | 5/2003 | Gatto et al. | |
| 2003/0125101 | A1 | 7/2003 | Campo | |
| 2003/0181231 | A1 | 9/2003 | Vancura et al. | |
| 2003/0193136 | A1 | 10/2003 | Walker et al. | |
| 2003/0211884 | A1 | 11/2003 | Gauselmann | |

FOREIGN PATENT DOCUMENTS

| | | |
|---|---|---|
| GB | 2 374 294 A | 10/2002 |
| WO | WO 00/67424 | 11/2000 |

OTHER PUBLICATIONS

"Scarne's Encyclopedia of Card Games," by John Scarne, (c) 1973 HarperCollins, pp. 278-288, chapter on Blackjack.*

Lucky Times California Lottery Newsletter published 1996.

Instant Winner Advertisement by Williams/WMS Gaming, published prior to 2002.

State of Washington Class III Gaming Compact Rules Governing Tribal Lottery Systems, Section 3, published Nov. 13, 1998.

* cited by examiner

| OUTCOME TYPES (VALUE LEVELS) 1 | WEIGHT 3 | PROBABILITY 5 | EXPECTED NUMBER OF OUTCOME OCCURRENCIES (PER 100 PLAYS) 7 |
|---|---|---|---|
| OUTCOME A (100 CREDITS) | 6 | $\frac{6}{100}$ =6% | 6 |
| RARE OUTCOME (100,000 CREDITS) | 4 | $\frac{4}{100}$ =4% | 4 |
| OUTCOME B (0 CREDITS) | 30 | $\frac{30}{100}$=30% | 30 |
| OUTCOME C (20 CREDITS) | 30 | $\frac{30}{100}$=30% | 30 |
| OUTCOME D (30 CREDITS) | 30 | $\frac{30}{100}$=30% | 30 |

GAMING DEVICE INCLUDING OUTCOME POOLS FOR PROVIDING GAME OUTCOMES

This application relates to the following co-pending commonly owned patent applications: "CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME," Ser. No. 10/371,723, "CENTRAL DETERMINATION GAMING SYSTEM WHERE THE SAME SEED IS USED TO GENERATE THE OUTCOMES FOR A PRIMARY GAME AND A SECONDARY GAME," Ser. No. 10/371,958, "CENTRAL DETERMINATION GAMING SYSTEM WHICH PROVIDES A PLAYER A CHOICE IN OUTCOMES," Ser. No. 10/442,318, "CENTRAL DETERMINATION GAMING SYSTEM WITH A GAME OUTCOME GENERATED BY A GAMING TERMINAL AND APPROVED BY A CENTRAL CONTROLLER," Ser. No. 10/383,423, "CENTRAL DETERMINATION GAMING SYSTEM WITH A GAMING TERMINAL ASSISTING THE CENTRAL CONTROLLER IN THE GENERATION OF A GAME OUTCOME," Ser. No. 10/431,755, "CENTRAL DETERMINATION GAMING SYSTEM WITH A KENO GAME," Ser. No. 10/601,482, "GAMING DEVICE HAVING AN INTERACTIVE POKER GAME WITH PREDETERMINED OUTCOMES," Ser. No. 10/934,258, "CENTRAL DETERMINATION POKER GAME," Ser. No. 10/945,642, "GAMING DEVICE HAVING A PREDETERMINED RESULT POKER GAME," Ser. No. 11/031,663, "CENTRAL DETERMINATION OFFER AND ACCEPTANCE GAME WITH MULTIPLIER," Ser. No. 11/048,220, "APPARATUS AND METHOD FOR GENERATING A POOL OF SEEDS FOR A CENTRAL DETERMINATION GAMING SYSTEM," Ser. No. 11/046,354, "APPARATUS AND METHOD FOR GENERATING A POOL OF SEEDS FOR A CENTRAL DETERMINATION GAMING SYSTEM," Ser. No. 11/071,372, "METHOD FOR DISPLAYING AN INTERACTIVE GAME HAVING A PREDETERMINED OUTCOME," Ser. No. 10/829,578, "METHOD FOR DISPLAYING AN INTERACTIVE GAME HAVING A PREDETERMINED OUTCOME," Ser. No. 10/846,448, and "METHOD FOR DISPLAYING AN INTERACTIVE GAME HAVING A PREDETERMINED OUTCOME," Ser. No. 10/864,784.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which includes at least one, and preferably a plurality of outcome pools for providing game outcomes.

BACKGROUND OF THE INVENTION

The majority of the contemporary gaming devices, such as slot machines, use probability data to generate awards and other outcomes. Such gaming devices typically include a low probability associated with the highest award, medium probabilities associated with medium range awards and higher probabilities associated with low range awards. Because the gaming devices rely upon probabilities, there is no certainty that a player will ever obtain any particular award. Just as in flipping a penny, no matter how many times a person flips the penny there is no certainty that heads will ever turn up. There is only a fifty percent probability or chance that heads will turn up. The expected occurrence of heads is fifty percent of the number of flips, but the actual occurrence of heads is uncertain.

As illustrated in FIG. 1, contemporary gaming devices include various value levels 1, weights 3 which determine the probabilities 5 associated with each value level, and the expected number of occurrences 7 of values. In the example illustrated in FIG. 1, a player has a six percent probability of obtaining outcome A, a four percent probability of obtaining the rare outcome, a thirty percent probability of obtaining outcome B, a thirty percent probability of obtaining outcome C and a thirty percent probability of obtaining outcome D. Over the play cycle of the gaming device, which in this case would be the sum of the weights or one hundred plays, the expected number of occurrences of outcomes is six outcome A's, four rare outcomes, thirty outcome B's, thirty outcome C's and thirty outcome D's.

These occurrences are only expected, not actual. No matter how many times a player plays the game, since the processor 9 generates outcomes completely based upon a probability calculation, there is no certainty that the game will ever provide the player with a rare outcome, such as a jackpot award, or any other specific value for that matter. It could be that after one hundred plays the gaming device processor generates one hundred outcome B's, resulting in no value being provided to players. Alternatively, the rare outcome may appear more than four occurrences in every hundred plays.

This uncertainty is faced by players and casinos or other gaming establishments. For example, most casinos prefer that a relatively high number of players hit low awards while a relatively low number of players hit high awards. When players hit high awards periodically, casinos attract more business because of the positive publicity large wins generate. By using desired probabilities, the casinos can also expect to make a certain level of profit. The probabilities can, however, unexpectedly cause casinos to suffer a loss or, on the other hand, to reap great profit in the short run and lose business in the long run due to a reputation for only paying out low awards.

Certain laws and regulatory bodies do not permit the use of probability-based gaming devices. These laws and regulatory bodies only permit the use of gaming devices which are guaranteed to provide certain or definite awards, so that, for example, a certain number of wins is guaranteed and the amount paid to players is guaranteed. One type of gaming device which complies with this requirement is the pull-tab type gaming machine. The pull-tab gaming machine provides players with all of the available outcomes over the course of the play cycle. Here, the outcomes are the pull-tabs, and the play cycle is the number of pull-tabs in the gaming machine. These pull-tab machines include mechanical bins which store and dispense paper or plastic pull-tabs. Depending upon which pull-tab a player draws from the machine, the player may receive a jackpot, another prize or no prize at all. By the time players have drawn all of the pull-tabs from the gaming machine, the gaming machine will have definitely paid out the jackpot.

One of the disadvantages with this type of gaming machine is that it relies upon a mechanical bin apparatus which is only useful in providing outcomes in mechanical pull-tab games. The mechanical bin apparatus cannot be used in gaming machines to produce outcomes for slot games, poker games, bonus games and a variety of other games. Moreover, the mechanical bin apparatus cannot produce video-based outcomes in contemporary gaming machines. Another disadvantage to the pull-tab machine is that if players learn that a player has won a jackpot at a certain pull-tab machine, the players tend to not play that pull-tab machine because there is no jackpot incentive until a new set of pull-tabs are available from the machine.

Therefore, there is a need to provide a gaming device which definitely provides players with all of the outcomes available in various types of computerized games over the course of a play cycle and which maintains player interest after a jackpot or large award is won.

SUMMARY OF THE INVENTION

The gaming device of the present invention includes one or more pools which the gaming device processor uses to provide players with all available awards and other outcomes over the course of a play cycle. In other words, when players have played the gaming device enough times, the gaming device will have definitely provided players with a predetermined number of awards of a predetermined award type. The term “pool,” as used herein, includes a group, set, table, unit or roster of data, preferably values. A value can include any positive number of credits or currency units, zero credits or currency units or any negative number of credits or currency units.

In one embodiment, the processor of the gaming device initially uses at least two pools to determine the outcome for each play of the game. In one embodiment, the pools are identical. In an alternative embodiment, the pools may not be identical. In the embodiment with identical pools, each pool includes the same number of loss outcomes, the same number of low value award wins, the same number of medium value award wins and the same number of large value award wins such as one large value award win. When the player initiates the play, the processor randomly selects one outcome from one of the pools to provide to the player. In this manner, each outcome from each pool is eventually provided to the player. At a certain point in time, another pool or a new pool is employed and the processor also picks from the new pool. The point in time may be after a certain number of outcomes are provided, when the first pool has less than a certain number of remaining outcomes, or when both pools (combined or individually) have a number of remaining outcomes less than a predetermined number or when the large value award is provided to the player. In this manner, new identical pools are regularly added to provide additional outcomes which the processor can select. This provides new large awards which keep the players interested in the game. Eventually, all of the outcomes in a pool will be employed and that pool will no longer be used by the processor. Accordingly, all outcomes of the pools will eventually be provided to the players of the game including the large awards. The exact wins and losses and payouts are determined based on the pools used.

In this embodiment, the gaming device of the present invention provides various outcomes over a particular game’s entire play cycle using the outcome pools. In one example embodiment of a five reel slot machine, the available outcomes may include a plurality of combinations of reel symbols, where each combination is associated with a value. The game may include: (a) five sevens associated with ten thousand credits; (b) five bars associated with three hundred credits; (c) three cherries associated with one hundred credits; (d) two bonus symbols associated with two thousand credits; and (e) a plurality of symbols, or symbol combinations associated with no credits. Each time a player plays the slot machine game, the gaming device processor will use the outcome pools to provide the player with a particular outcome. Based on the predetermined conditions, pools are regularly added for providing outcomes. This process continues from game to game and player to player until the gaming device has provided players with all of the available outcomes from a pool. Thereafter, the processor does not select outcomes from that pool and uses the other pools added to continue to select outcomes.

It should be appreciated that the multiple pools can be set up in any manner desired by the game implementers. The pools, for example, could include any desired number of losses, ranges of wins, small wins, medium size wins, large wins and very large or jackpot wins. The pools may also vary in the number, type and value of the outcome in each pool as further discussed below.

In one alternative embodiment of the present invention, the gaming device includes a gaming device processor which is electronically connected to a data storage device. The data storage device stores a plurality of outcome pools. Each outcome pool includes different levels of values. For example, an outcome pool having a total of thirty values may include five values at a level of one hundred credits, ten values at a level of fifty credits and twenty values at a level of five credits. When a predetermined event occurs, the gaming device processor selects an outcome pool, preferably randomly. The predetermined event could be the initiation of a game, wager on a game, a predetermined input made by a player such as activation of a max bet or spin button, the completion of a predetermined sequence of events or any other predetermined occurrence. The gaming device processor then randomly draws or retrieves a value from the selected pool. It is preferable that the gaming device processor randomizes the values in the pool prior to drawing a value from the pool. The gaming device then provides this drawn value to the player. The gaming device processor will then prevent this drawn value from being provided to the player in the future until the processor has drawn all of the values in the pool of the drawn value.

Upon the completion of the play cycles of the pools in the gaming device, the gaming device processor will have provided players with all of the values in the pools. In particular, and in contrast to the prior art probability-based technique, the gaming device processor will have definitely provided players with all of the available rare outcomes, such as jackpot values or other relatively large values. This guarantees what the gaming establishment will take in and payout on the gaming device.

In one example of one embodiment, the gaming device includes a gaming device processor which randomly selects and uses outcome pools. Each pool includes a predetermined quantity of outcomes. For example, each pool may include ten outcome A’s, three outcome B’s and one outcome C. In this embodiment, when a predetermined event occurs the gaming device processor randomly selects one of the pools. The gaming device processor then randomizes the outcomes within the selected pool and then draws one of the outcomes from the selected pool. Once the gaming device processor draws a specific outcome and provides that outcome to a player, the gaming device processor will not provide that outcome to the player again until the gaming device processor has drawn all of the outcomes in all of the pools currently available to the processor.

In another embodiment, the gaming device includes a gaming device processor which selects and uses outcome pools in a predetermined order. The gaming device processor preferably uses the pools in a sequential order and uses an additional pool each time a jackpot is drawn. In one example, each pool includes six lose outcomes, three win outcomes and one jackpot outcome, and the processor initially draws from pool one. If the processor draws a jackpot, the processor's next draw is from pools one and two. With this technique, a player always has at least one opportunity to gain a jackpot or other predetermined outcome without changing the total value paid out by the gaming device over a play cycle.

In an alternative embodiment, the gaming device includes a gaming device processor which uses a single outcome pool. The outcome pool includes a plurality of lose outcomes, win outcomes and jackpot outcomes. When a predetermined event occurs, the gaming device processor draws one of the outcomes from the pool. Preferably, prior to making the draw, the gaming device processor randomizes all of the outcomes. Every time the gaming device processor draws an outcome and provides that outcome to a player, the gaming device processor will not provide that outcome to a player again until all of the outcomes in the pool have been drawn and provided to players.

It should be appreciated that in various embodiments of the present invention, the outcome pools can include awards or values, opportunities to obtain an award, advancements to a bonus round, automatic replays of a game, penalties or value decreases, termination or game end events, game continuation events or any other predetermined events. Preferably certain symbols or graphics are associated with certain outcomes. For example, if a player reaches one type of symbol, the player receives a certain value, and if the player reaches a different type of symbol, the player receives a different value.

It is preferable that at least one of the outcomes is a rare outcome. A rare outcome includes a particular type of outcome in a pool which is outnumbered by at least four times by the other types of outcomes in that pool. For example, a rare outcome could be a jackpot award, a bonus round advancement, a royal flush, a predetermined award level or a predetermined bonus value. A game developer can predetermine a game's actual value payout over a play cycle by multiplying the value associated with each outcome by the quantity of such outcomes in the outcome pools. The play cycle is the total number of outcomes (regardless of the type) in a particular pool.

In the examples described above, the gaming device processor draws one outcome at a time. It should be appreciated, however, that the gaming device processor can draw multiple outcomes from one or more outcome pools and provide a player with a plurality of such outcomes at once.

The gaming device of the present invention draws outcomes, such as values, from pools in order to provide players with such outcomes. By using outcome pools, instead of probability data, the gaming device provides players with a certainty that the gaming device will provide players with certain awards over a course of time. The gaming device of the present invention can be programmed to generate any type of outcome for any type of game. This type of gaming device provides players with increased enthusiasm and excitement.

It is therefore an advantage of the present invention to provide a gaming device including outcome pools for providing game outcomes.

Another advantage of the present invention is to provide a gaming device which has predetermined outcomes, all of which will definitely be generated over a course of time.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 2A:
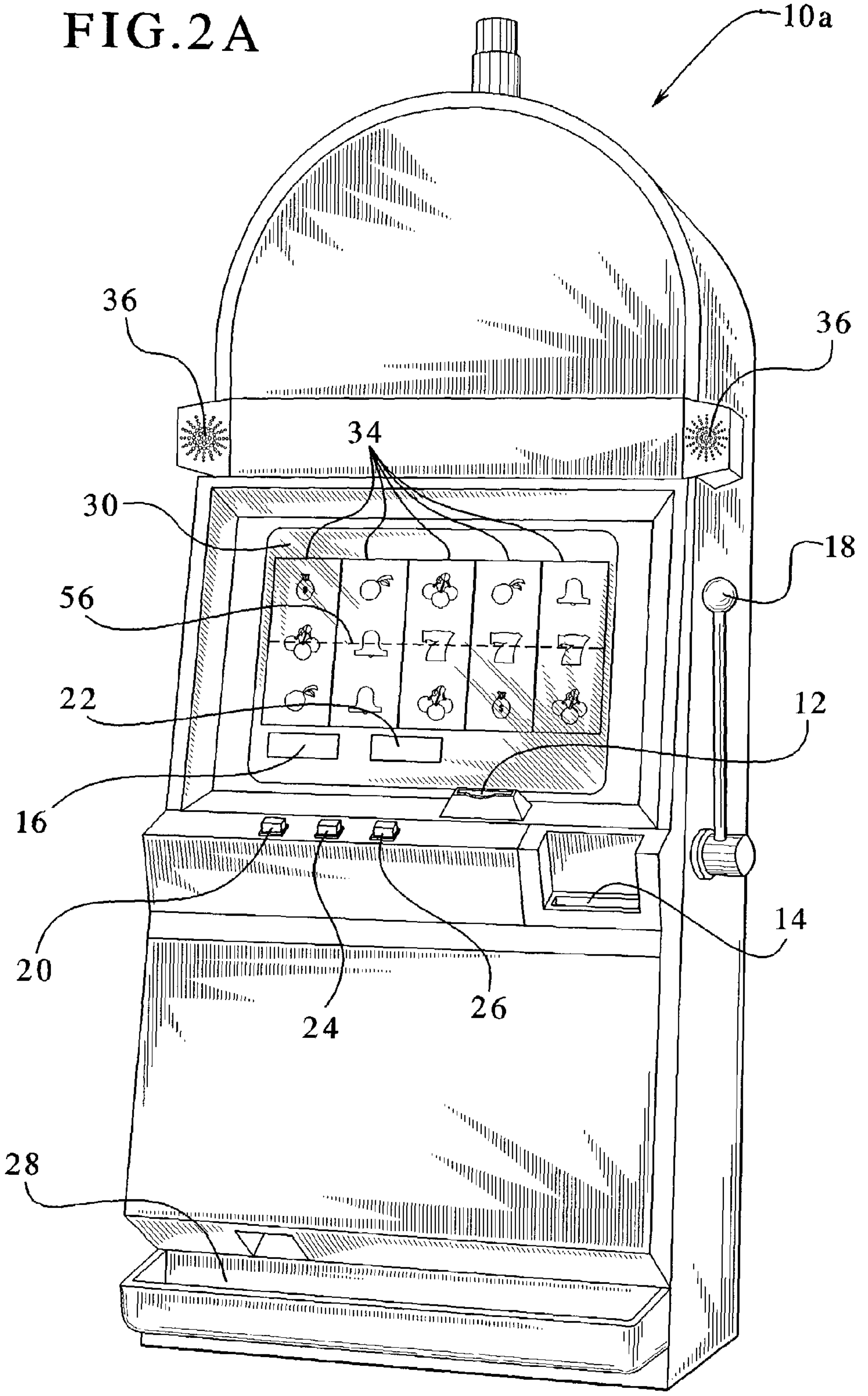
FIG. 2A is a perspective view of one embodiment of the gaming device of the present invention.
Figure 2B:
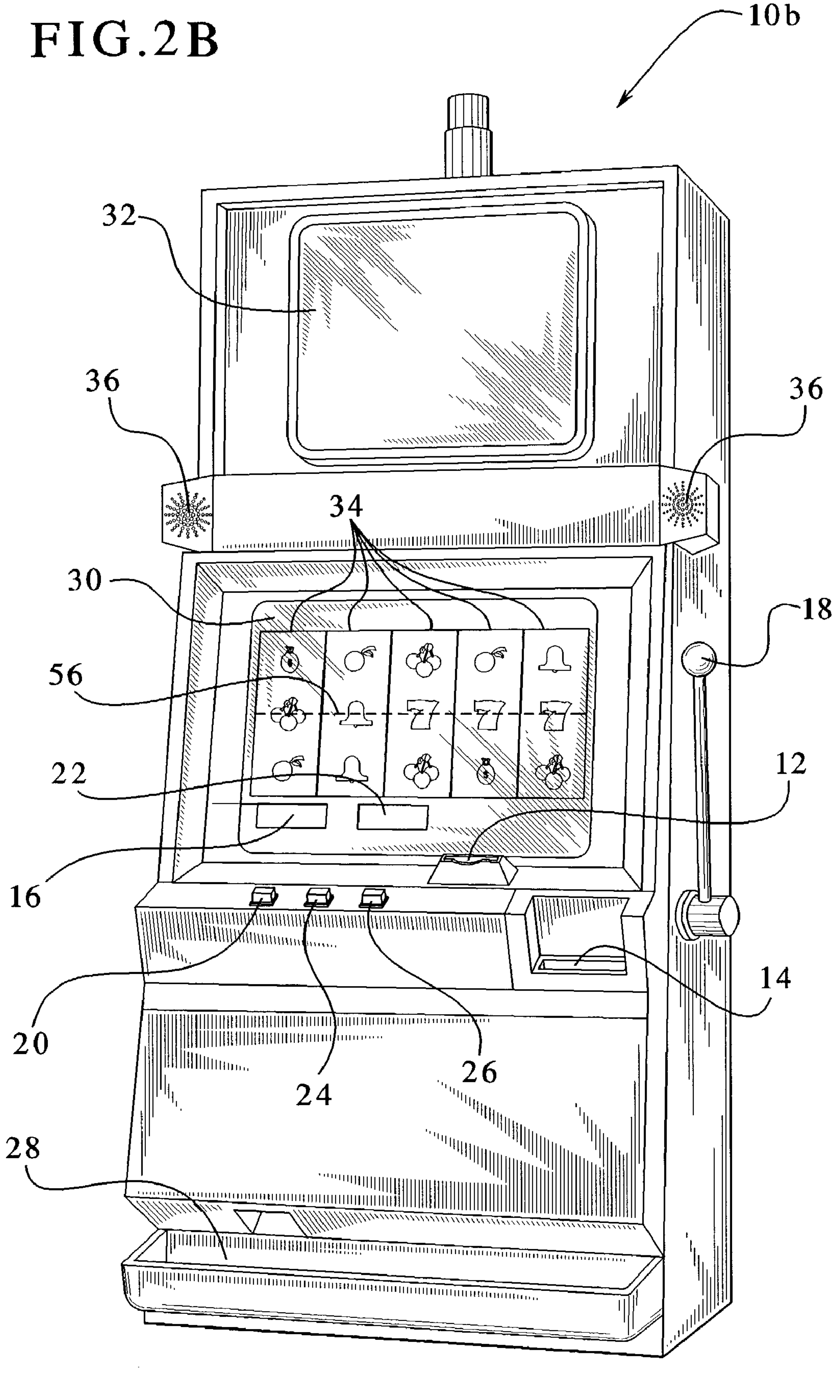
FIG. 2B is a perspective view of another embodiment of the gaming device of the present invention.

Referring now to the drawings, two embodiments of the gaming device of the present invention are illustrated in FIGS. 2A and 2B as gaming device 10*a* and gaming device 10*b*, respectively. Gaming device 10*a* and/or gaming device 10*b* are generally referred to herein as gaming device 10. Gaming device 10 preferably has controls, displays and features of a conventional slot or other gaming machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 2A and 2B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any suitable primary game such as slot, blackjack, poker and keno, any of their bonus triggering events and any of their bonus round games. The symbols and indicia used on and in gaming device 10 may be in mechanical, electrical or video form.

As illustrated in FIGS. 2A and 2B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 2A and 2B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 2A includes a central display device 30, and the alternative embodiment shown in FIG. 2B includes a central display device 30 as well as an upper display device 32. In the slot embodiment, gaming device 10 displays a plurality of reels 34, such as three to five reels 34 in mechanical or video form at one or more of the display devices. A display device can be any suitable viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 3:
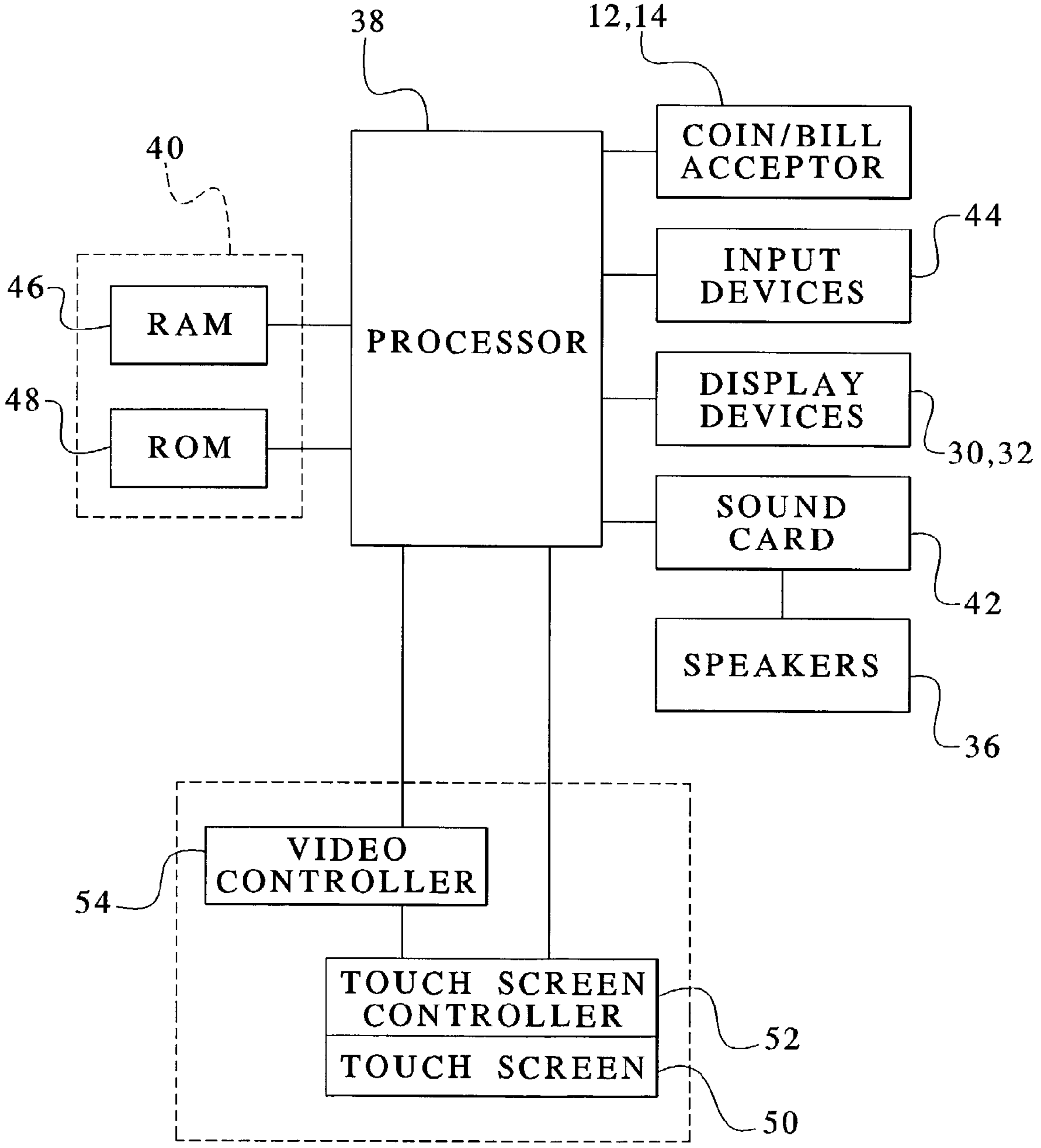
FIG. 3 is a schematic block diagram of the electronic configuration of one embodiment of the gaming device of the present invention.

As illustrated in FIG. 3, the general electronic configuration of gaming device 10 preferably includes: a processor 38; a memory device or data storage device 40 for storing program code and other data specifically including the pools as discussed below; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 3, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate locations. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 2A, 2B and 3, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, the gaming device 10 may also give players the opportunity to win credits in a bonus round. This type of gaming device 10 will include a program which will automatically begin a bonus round when the player has achieved a qualifying condition in the game. This qualifying condition can be a particular arrangement of one or more indicia on a display device. The gaming device 10 may use a video-based central display device 30 to enable the player to play the bonus round. As illustrated in the five reel slot game shown in FIGS. 2A and 2B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Outcome Pools

Figure 4:
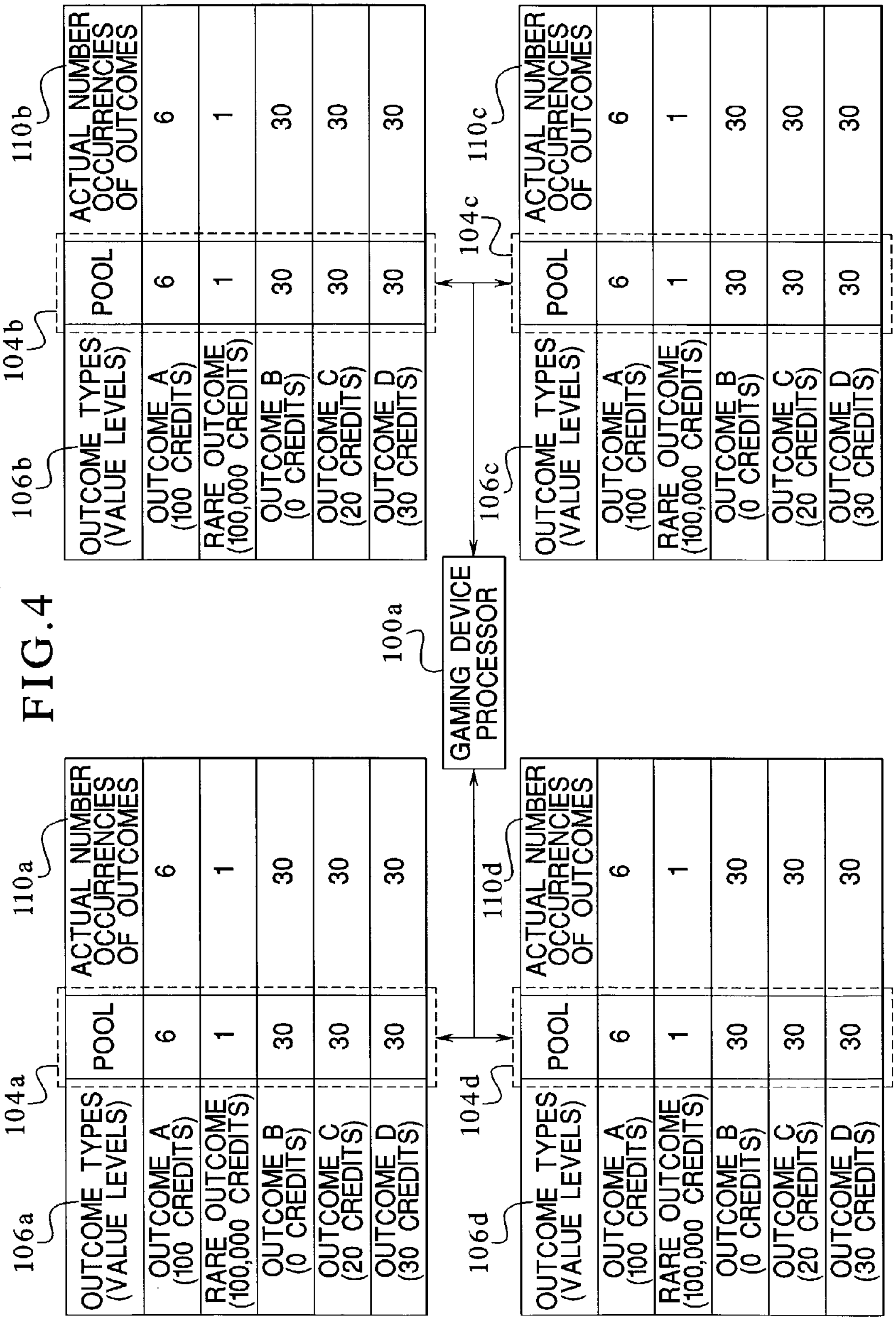
FIG. 4 is a schematic block diagram illustrating an example of the outcome pools of one embodiment of the gaming device of the present invention.

Referring now to FIG. 4, in one embodiment of the present invention the gaming device includes a gaming device processor 100*a* which is electronically connected to a memory device or data storage device (not shown). The data storage device stores outcome data within outcome groups or pools 104*a*, 104*b*, 104*c* and 104*d*. Each outcome pool includes different types of outcomes 106*a*, 106*b*, 106*c* and 106*d*. These outcomes are illustrated here as outcome A (a value of one hundred credits), rare outcome (a value of one hundred thousand credits), outcome B (a value of zero credits), outcome C (a value of twenty credits) and outcome D (a value of thirty credits). Though a rare outcome is included in this example, it should be appreciated that the gaming device of the present invention need not include a rare outcome.

A game developer controls the actual number of occurrences of outcomes by creating the outcome pools as desired. For example, the developer can cause the gaming device processor to provide players with one, fifty or any other quantity of one hundred credit values over a play cycle simply by varying the quantity of such one hundred credit values in the outcome pool. In this example, the play cycle for each of the outcome pools 104*a*, 104*b*, 104*c* and 104*d* is ninety seven (i.e., six plus one plus thirty plus thirty plus thirty). Thus, the total play cycle for the gaming device is three hundred eighty-eight.

When a predetermined event occurs, the gaming device processor 100*a* selects an outcome pool, preferably randomly. The gaming device processor 100*a* then draws or retrieves a value from the pool. It is preferable that the gaming device processor randomizes the values in a pool prior to drawing one from that pool.

The gaming device then provides this drawn value to the player. For example, the gaming device processor 100*a* may select pool 104*b* and draw one of the thirty values of zero credits. A computer program instructs the processor 100*a* to prevent this drawn value from being provided to the player in the future until all of the values in pool 104*b* have been drawn. Such program may instruct the processor 100*a* to delete the drawn value, move the drawn value to a predetermined memory storage location, flag or modify the drawn value so that the processor does not read the drawn value, or carry out any other suitable activity to prevent the drawn value from being drawn for a certain period of time. Alternatively, the gaming device processor 100*a* may re-draw the drawn value and repeatedly put the re-drawn value back into the pool until all of the values in that pool have been drawn. In such an embodiment, the gaming device processor may draw the same value from the same pool back to back, for example. However, the processor will not provide this value to the player more than once until all of the values in that pool have been drawn. Upon the completion of the play cycles for the four pools 104*a*, 104*b*, 104*c* and 104*d*, the gaming device processor 100*a* will have provided players with the actual number of occurrences 110*a*, 110*b*, 110*c* and 110*d*.

Figure 1:
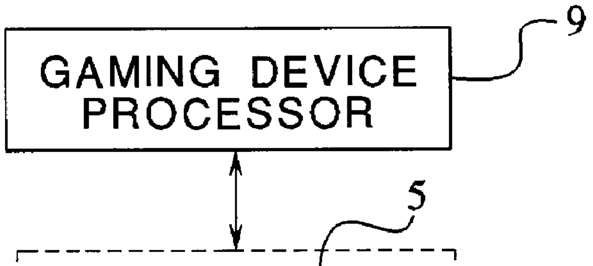
FIG.1 (PRIOR ART)
FIG. 1 is a table illustrating an example of a probability-based outcome generator in one example of a prior art gaming device.

In particular, and in contrast to the probability-based outcome generation technique illustrated in FIG. 1, gaming device processor 100*a* will have definitely provided players with the four rare outcomes, each having a value of one hundred thousand. It is preferable that the players are aware that the gaming device has multiple pools, but are unaware as to which pool the processor is using to draw values and as to how many pools are included in the gaming device. Accordingly, if a player achieves a rare outcome, such as a jackpot, the other players would still have the incentive to play the gaming device in an attempt to obtain another rare outcome or jackpot.

Figure 5:
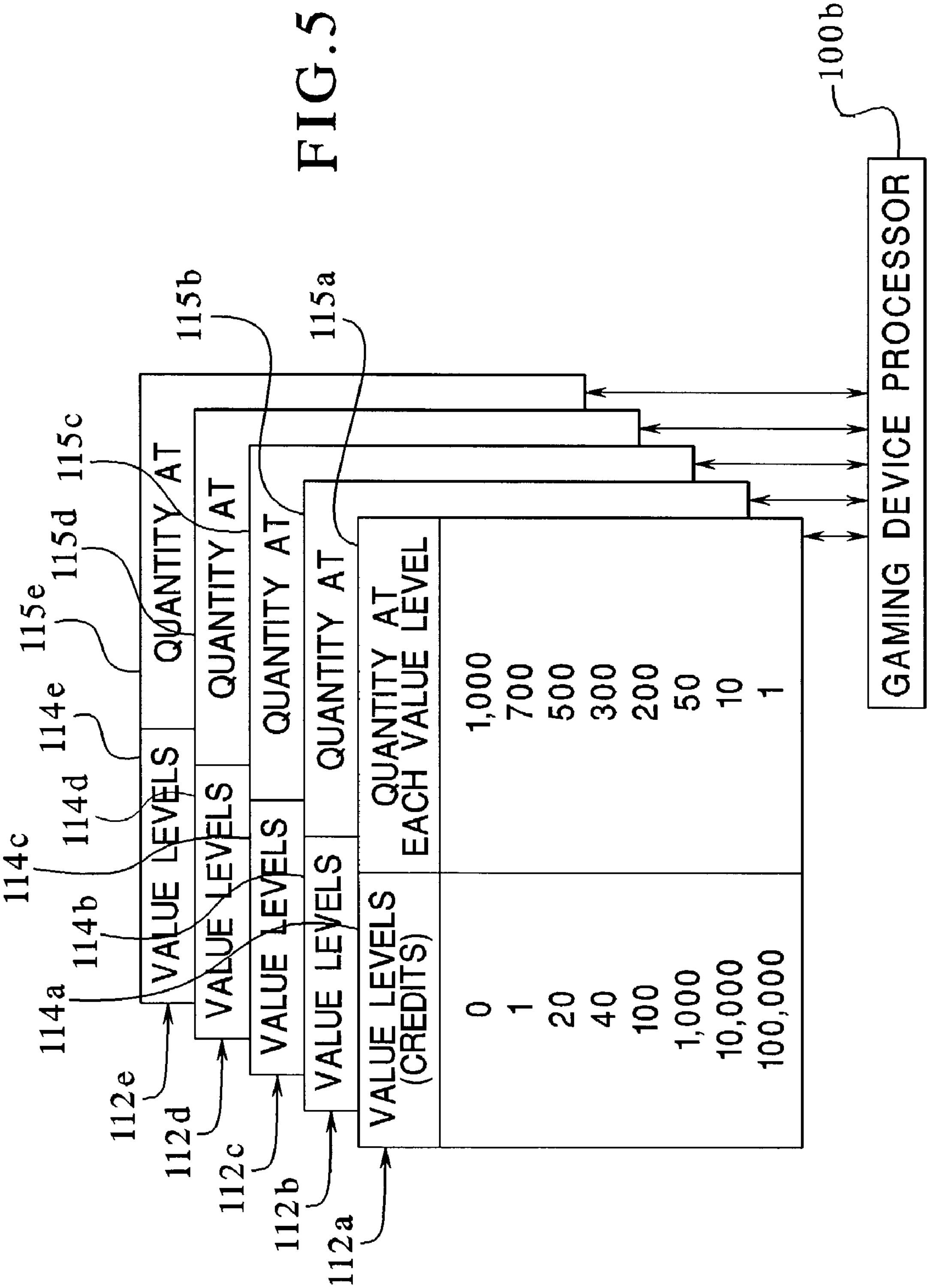
FIG. 5 is a schematic block diagram illustrating another example of the outcome pools of one embodiment of the gaming device of the present invention.

Another example of one embodiment of the gaming device of the present invention is illustrated in FIG. 5. Here, gaming device processor 100*b* is electronically connected to a data storage device (not shown). The data storage device includes different value pools 112*a* through 112*e*. Each pool includes a predetermined quantity 114*a* through 114*e* of different value levels 115*a* through 115*e*. For example, pool 112*a* includes one thousand values of zero credits, seven hundred values of one credit, five hundred values of twenty credits, three hundred values of forty credits, two hundred values of one hundred credits, fifty values of one thousand credits, ten values of ten thousand credits and one value of one hundred thousand credits.

Upon the occurrence of a predetermined event, the processor 100*b* first selects a pool, preferably randomly, and then randomly draws a value in the selected pool. The processor 100*b* provides the drawn value to a player. The processor 100*b* will not provide this value to a player again until all of the other values in the selected pool have been provided to players. Alternatively, the processor 100*b* can prevent this value from being provided again until all of the values in all of the pools 112*c* through 112*e* have been provided to players.

In one example of this embodiment, the processor begins providing game outcomes by using a single pool 112*a*. When a predetermined event occurs, the processor adds a pool 112*b*. The processor then proceeds to provide players with outcomes by making draws from pools 112*a* and 112*b*. The processor continues to provide outcomes and to add pools in this manner until the gaming device is re-programmed or taken out of service. Any predetermined event can cause the program to add a pool, though preferably the event is exhaustion of all outcomes in a pool or the drawing of a rare outcome, such as a relatively high value.

In order to enable the processor to change from using one pool to two pools to three pools and so forth, the gaming device can be pre-stored with a relatively high number of reserve pools, or the processor can be programmed to dynamically generate new pools. In the latter case, the processor preferably uses a pool program which includes computer instructions for generating and storing pools for use.

Figure 6:
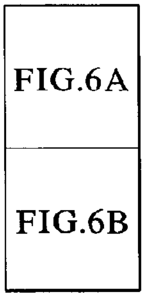
FIG. 6 is a schematic block diagram illustrating the contrast between the draw-based outcome generator of the present invention and the prior art probability-based outcome generator.
Figure 6A:
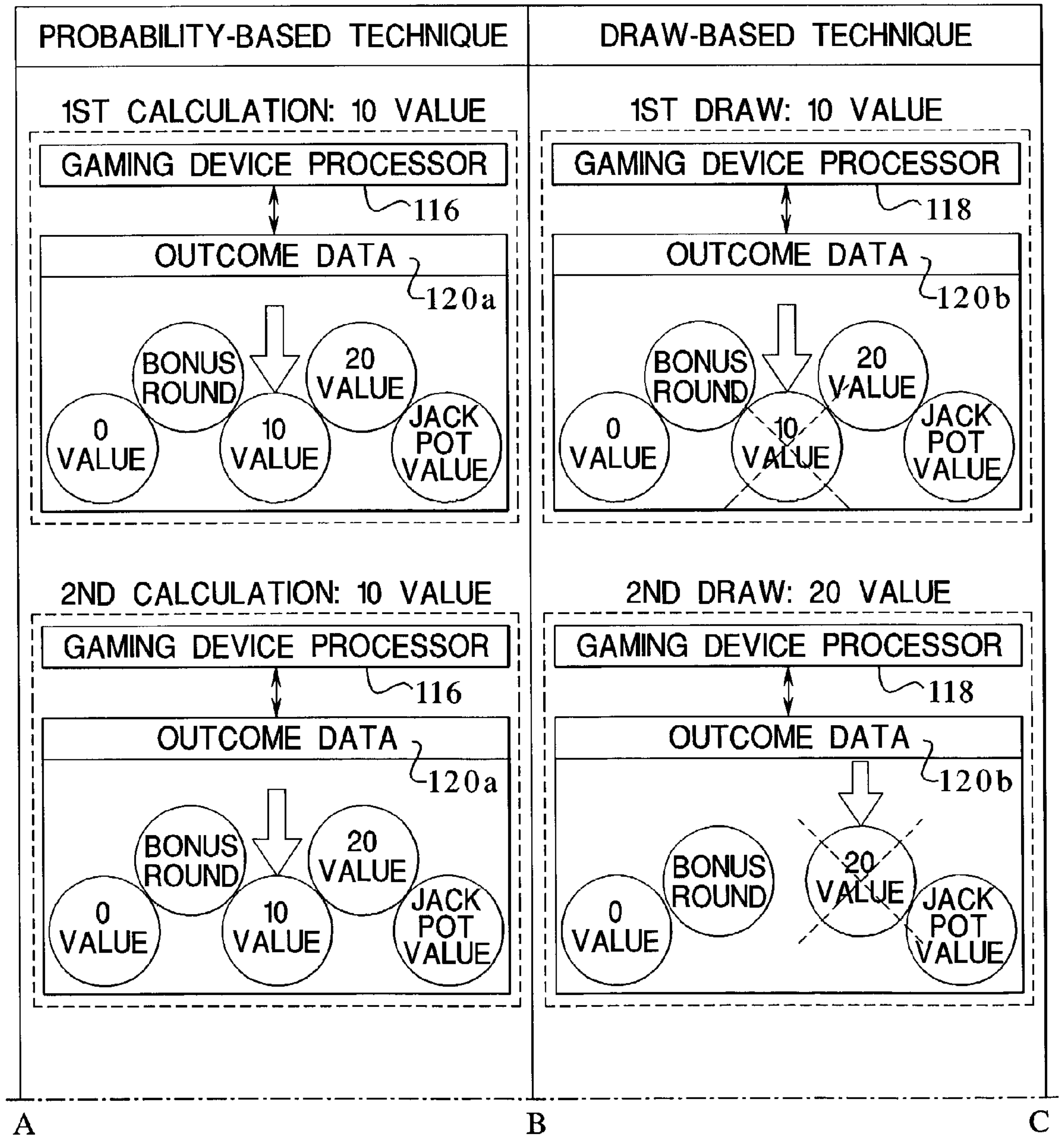
Figure 6B:
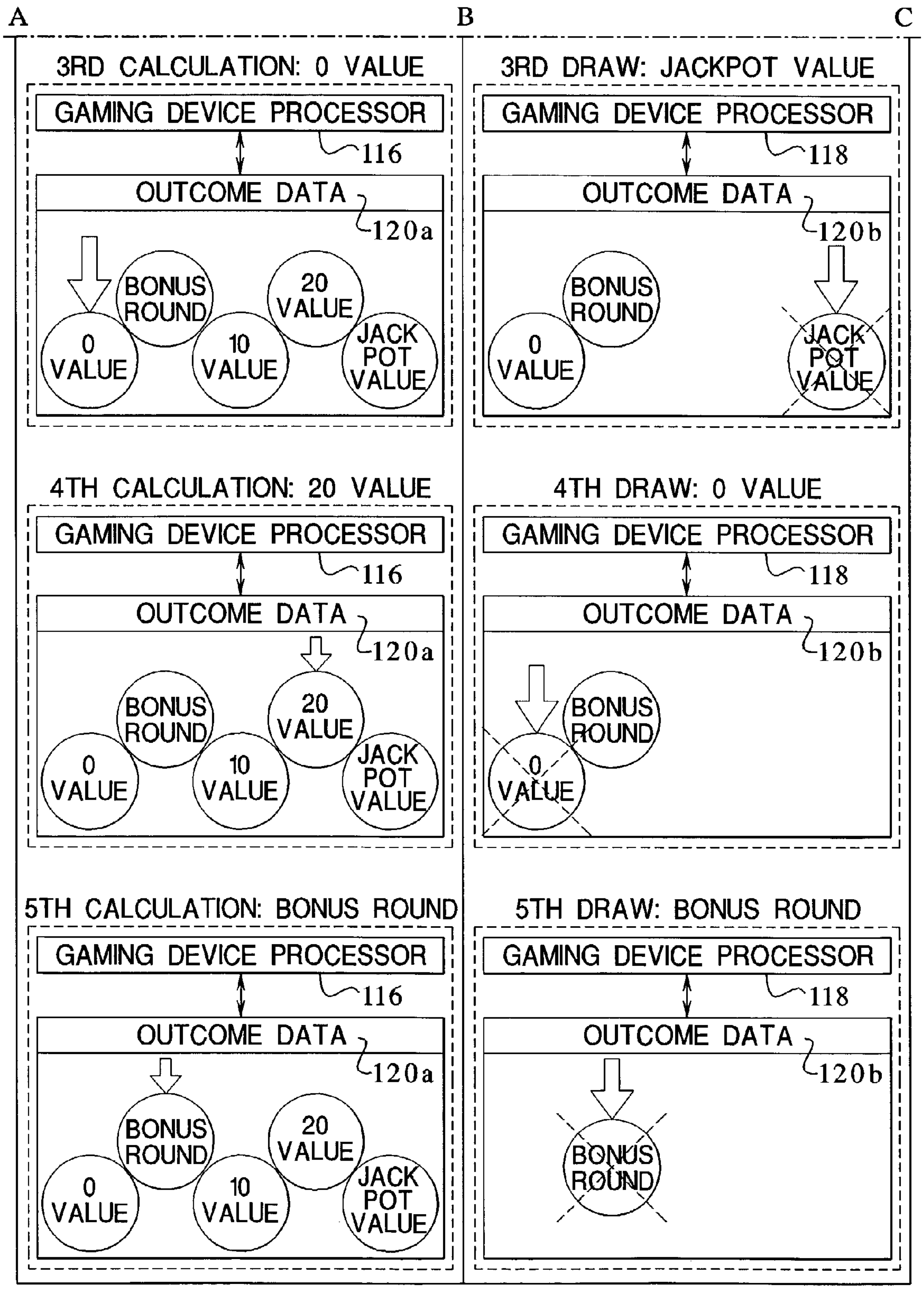

The concept of drawing outcomes from outcome pools in comparison to using probability data to generate outcomes is further illustrated in FIG. 6. At the outset, the outcome data 120*a* used by processor 116 is the same as the outcome data 120*b* used by processor 118. This outcome data includes five outcomes: one value of zero credits, one bonus round, one value of ten credits, one value of twenty credits and one jackpot value. The probability of generating any one of these outcomes is twenty percent because one hundred percent divided by five is twenty percent. This probability is constant each time the processor 116 generates an outcome.

Using the probability-based technique, in this example the gaming device processor 116 generates the value of ten upon the first calculation. Upon the second calculation, the gaming device processor 116 generates the value of ten again. Upon the third calculation, the gaming device processor 116 generates the value of zero. Upon the fourth calculation, the processor 116 generates the value of twenty. Upon the fifth calculation, the processor 116 generates the bonus round. At this point, the play cycle of five is complete.

As illustrated, each time the gaming device processor 116 generates an outcome, this outcome can be regenerated time and time again. In addition, whether the gaming device processor 116 generates five outcomes or one hundred outcomes, there is no certainty that the gaming device processor 116 will ever generate any particular outcome, such as the jackpot. This is because there is always only a twenty percent probability of gaining the jackpot. In other words, the odds of obtaining a particular award are always one to four. This probability-based technique is the same technique employed in drawing marbles from a jar and putting the marbles back into the jar after each draw.

In contrast, with the draw-based technique, the marbles would be permanently removed from the jar after they are drawn. In the example of the draw-based technique illustrated in FIG. 6, the outcome data 120*b* includes five outcomes: one value of zero credit, one bonus round, one value of ten credits, one value of twenty credits and one jackpot value. Instead of generating outcomes using a probability calculation, the processor 118 draws, preferably randomly, one of the five available outcomes.

The odds of gaining any one of the five outcomes becomes greater with each draw. Before the first draw, the odds of obtaining any one of the five outcomes is one to four. Here, the gaming device processor 118 draws the value of ten upon the first draw. As illustrated by the X drawn in phantom, this value of ten is then removed from the outcome data 120*b* or otherwise treated by the gaming device processor 118 as if it were removed. At this point, the odds of gaining any one of the remaining four outcomes is one to three. Upon the second draw, the gaming device processor 118 draws the value of twenty. Again, as illustrated by the X drawn in phantom, this value of twenty is removed from the outcome data 120*b*. At this point, the odds of gaining any one of the remaining three outcomes is one to two. Upon the third draw, the gaming device processor 118 draws the jackpot value. At this point, the odds of gaining any one of the remaining two outcomes is one to one. Upon the fourth draw, the gaming device processor 118 draws the value of zero. At this point, the remaining outcome will definitely be drawn because it is the sole remaining outcome. Upon the fifth draw, the gaming device processor 118 draws the bonus round. At this point, the play cycle is complete, and the gaming device processor 118 has provided the players with all of the available outcomes. As indicated above, after a predetermined number of outcomes are drawn, a jackpot or rare outcome is drawn or when a pool is empty or has less than a predetermined number of outcomes remaining, the gaming device can add another pool for the processor to select from. This process facilitates continuous play from the pools and replacement of the pools on a regular basis.

Figure 7:
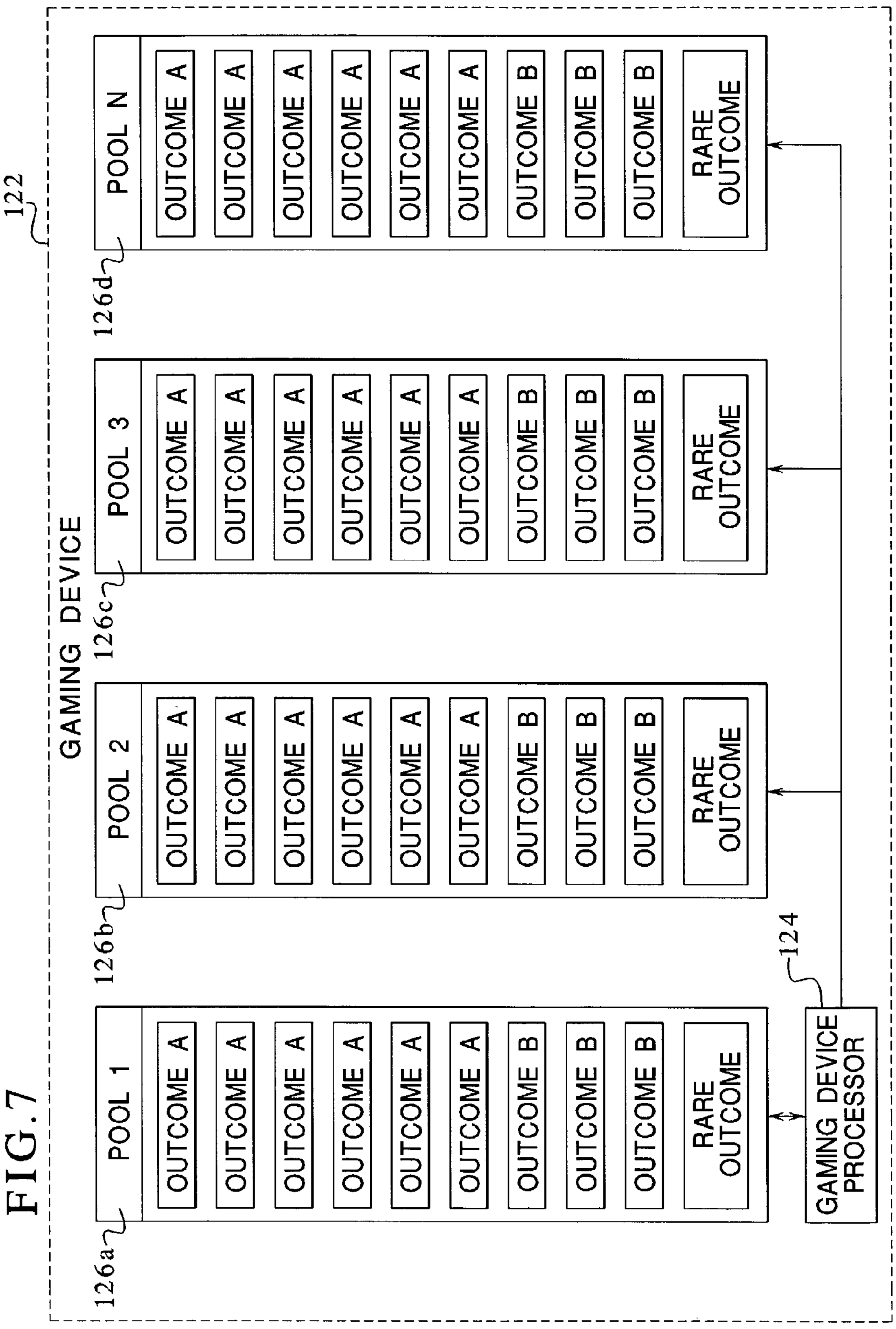
FIG. 7 is a schematic block diagram illustrating the draw-based outcome generator of one embodiment of the gaming device of the present invention.

In one example of one embodiment illustrated in FIG. 7, gaming device 122 includes a gaming device processor 124 which communicates with pool 126*a*, pool 126*b*, pool 126*c* and pool 126*d*. In each pool, six of the outcomes are outcome A's, three of the outcomes are outcome B's, and one of the outcomes is a rare outcome. In this embodiment, when a predetermined event occurs, the gaming device processor 124 randomly selects one of the pools 126*a*, 126*b*, 126*c*, or 126*d*. The gaming device processor 124 then randomizes the outcomes within the selected pool. The gaming device processor 124 then draws one of the outcomes in the selected pool. Once the gaming device processor 124 draws an outcome and provides that outcome to a player, the gaming device processor will not provide that outcome to the player again until the gaming device processor has drawn all of the outcomes in all of the pools. As indicated above, after a predetermined number of outcomes are drawn, a jackpot or rare outcome is drawn or when a pool is empty or has less than a predetermined number of outcomes remaining, the gaming device can add another pool for the processor to select from. This process facilitates continuous play from the pools and replacement of the pools on a regular basis.

Figure 8:
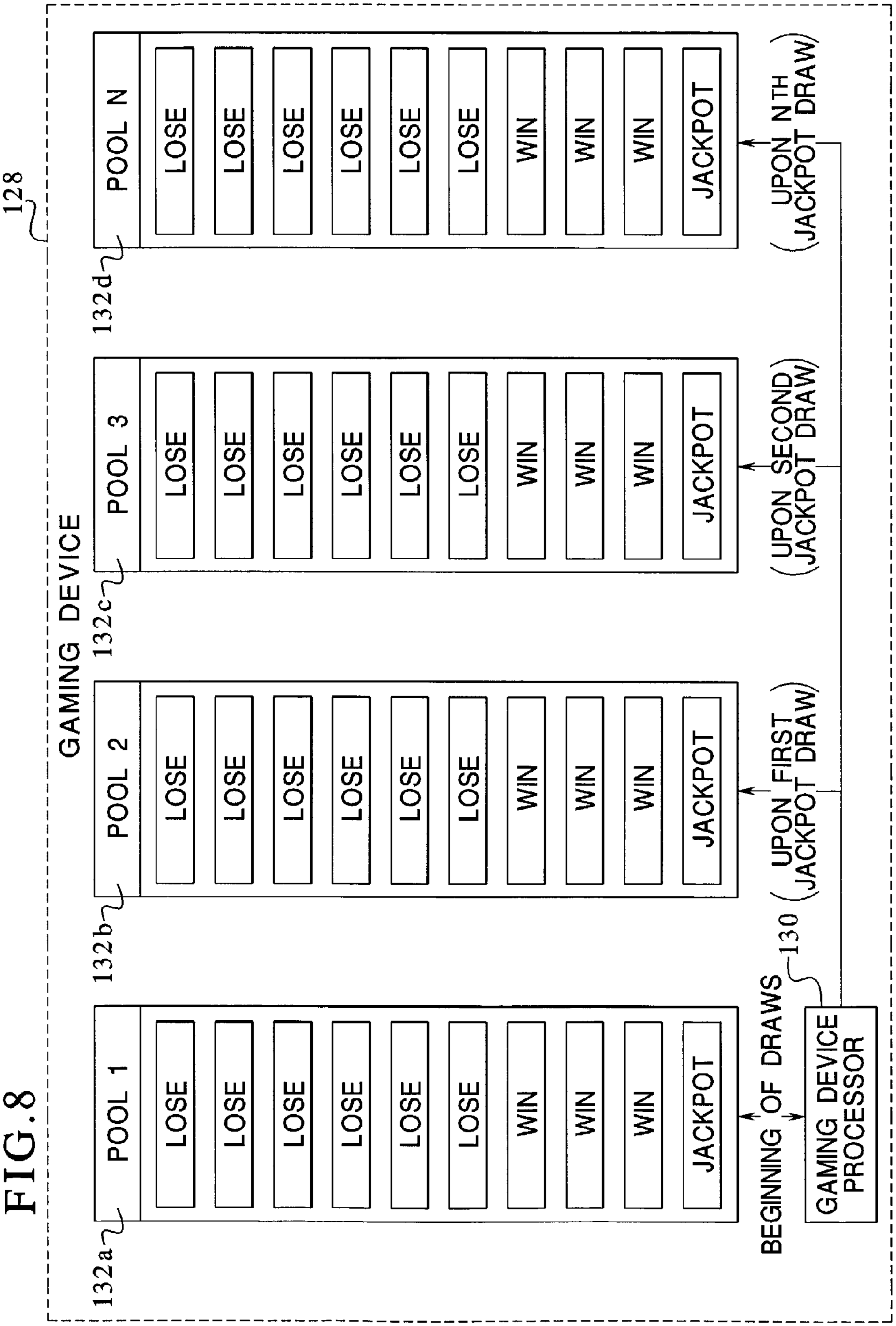
FIG. 8 is a schematic block diagram illustrating the draw-based outcome generator of another embodiment of the gaming device of the present invention.

In one example of another embodiment illustrated in FIG. 8, gaming device 128 includes a gaming device processor 130 which communicates with a data storage device (not shown). The data storage device stores outcomes in pools 132*a*, 132*b*, 132*c* and 132*d*. Each pool includes six lose outcomes, three win outcomes and one jackpot. A lose outcome provides a player with zero value. A win outcome provides a player with a relatively minimal value, and a jackpot provides a player with a relatively high value. The gaming device processor 130 uses the pools in a sequential order, and adds an additional pool whenever a jackpot is drawn. In this manner, there is always a possibility of obtaining one of the jackpots and the number of available jackpots remains constant, even though the odds of obtaining the jackpot change for each play.

Figure 9:
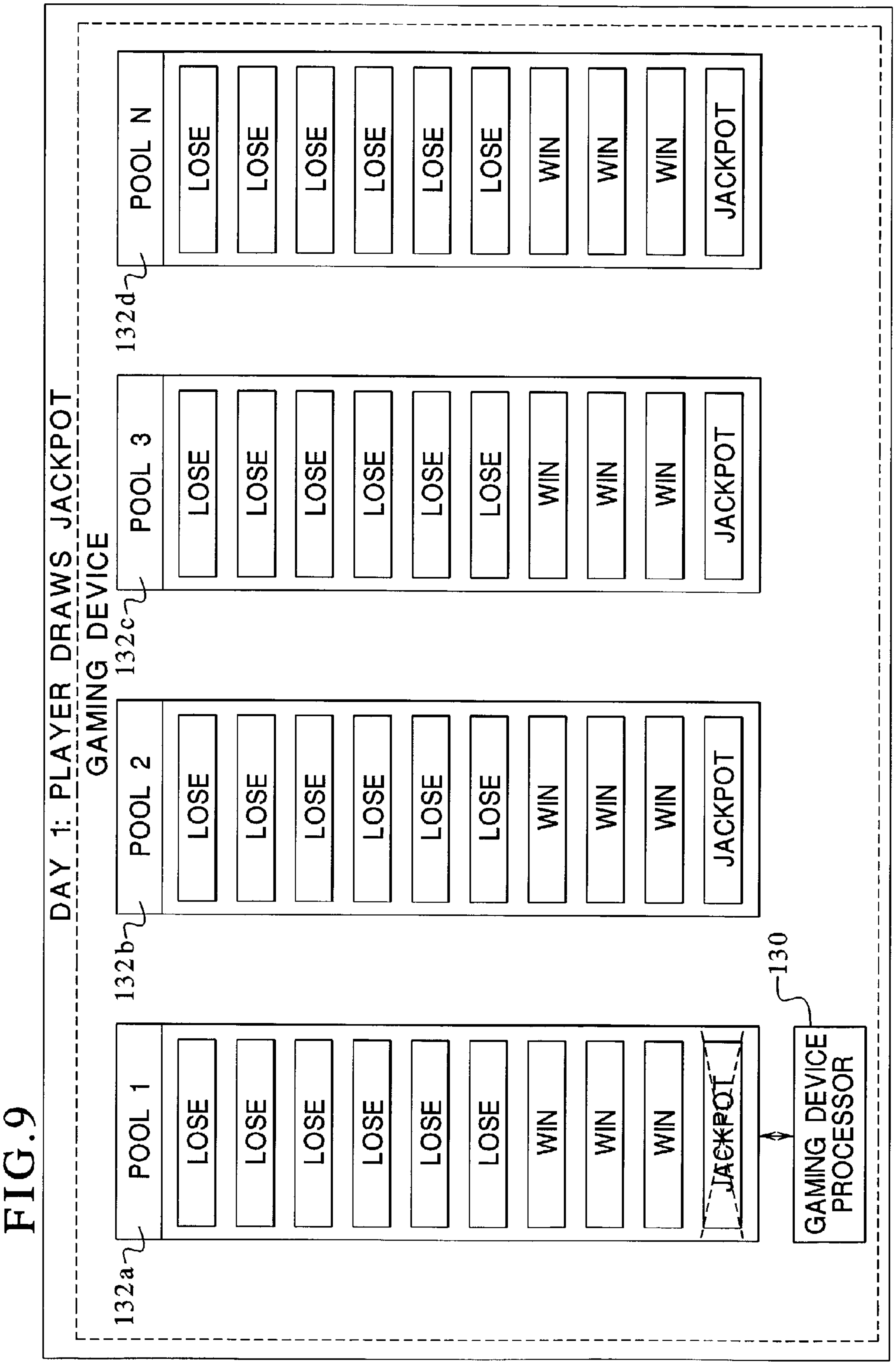
FIGS. 9 through 16 are schematic block diagrams illustrating one example of the draw-based outcome generator of one embodiment of the gaming device of the present invention.
Figure 10:
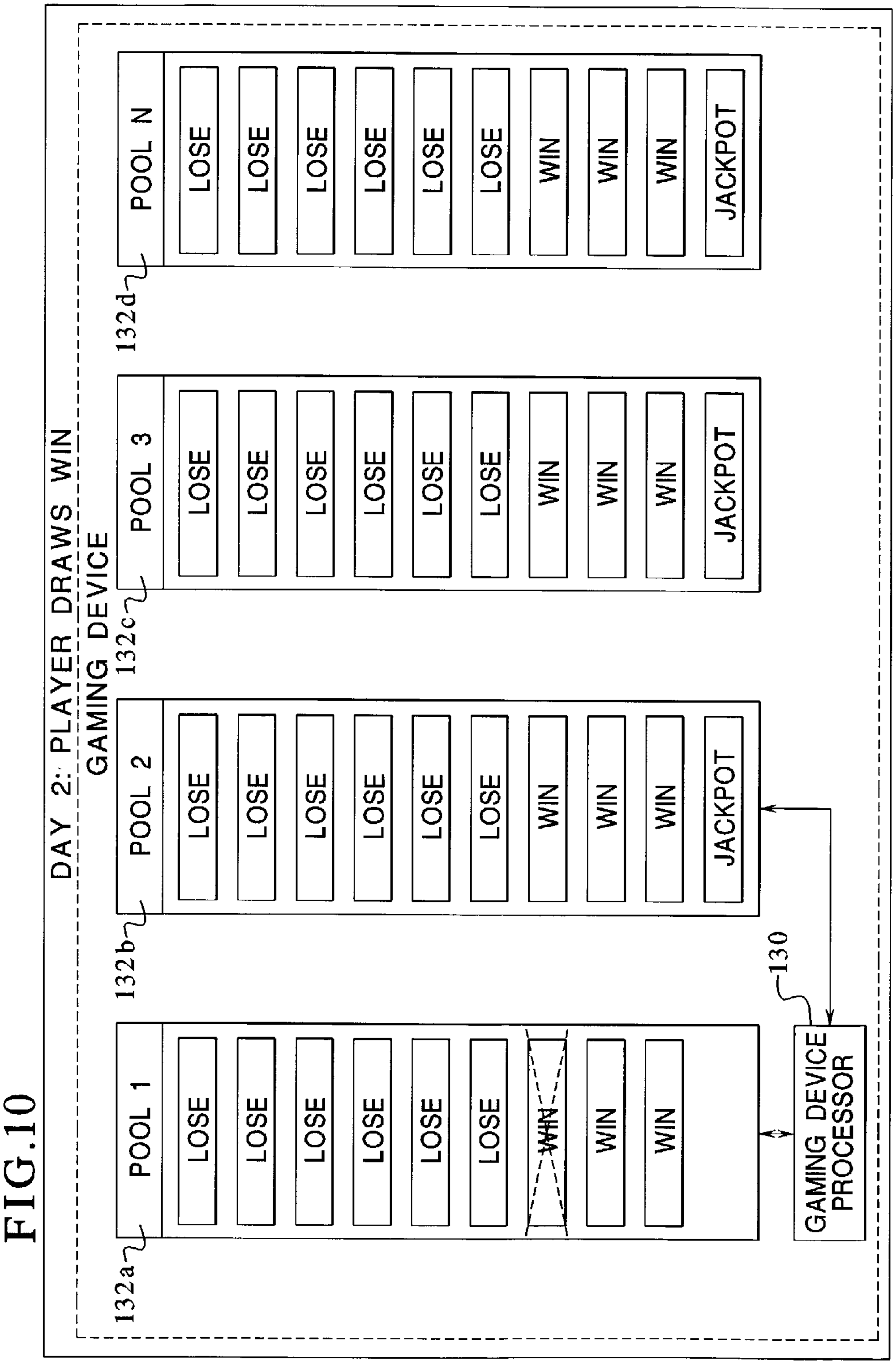
Figure 11:
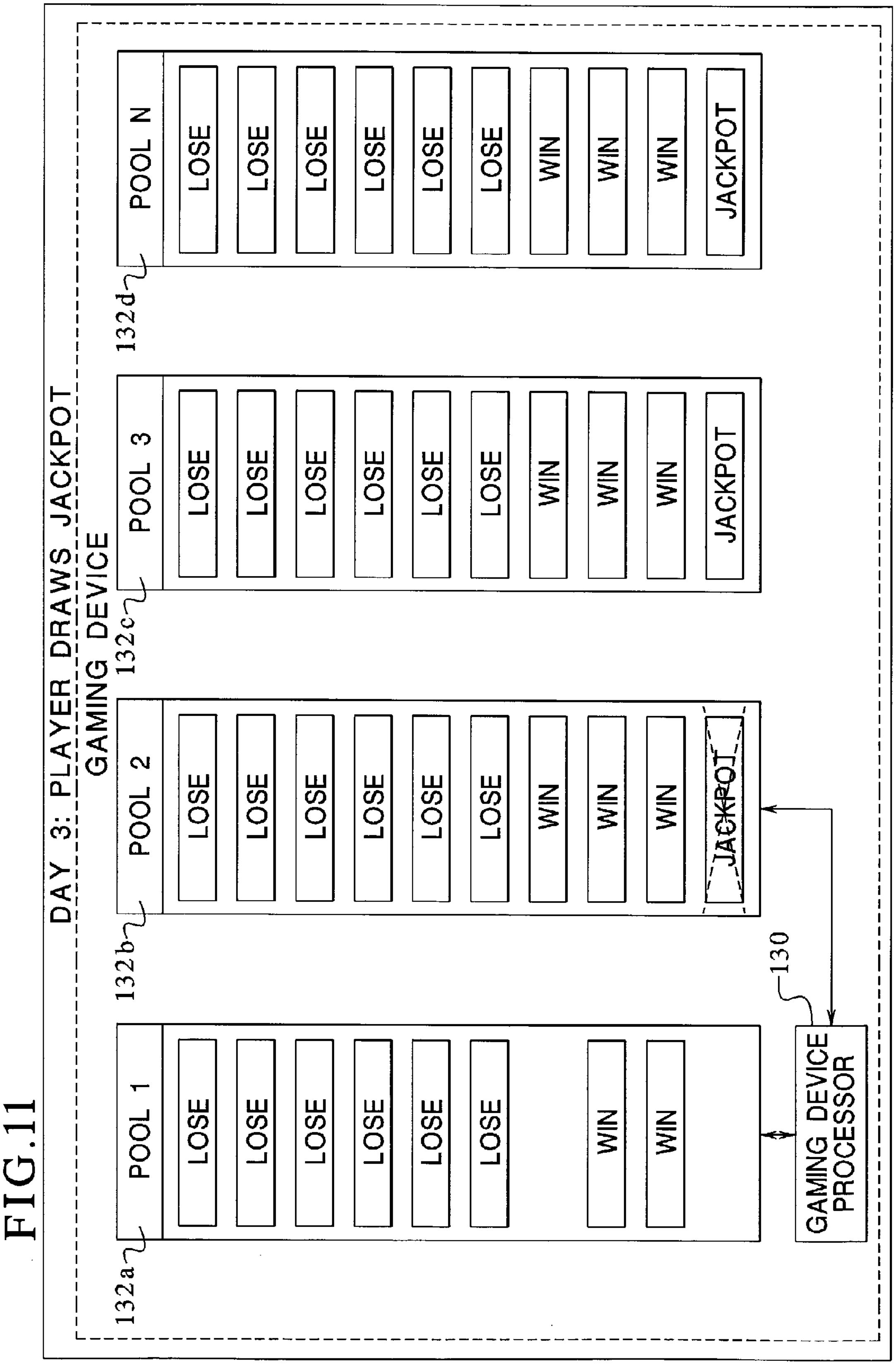

FIGS. 9 through 16 illustrate one example of this embodiment in which eight different draws are made on eight different days. When an outcome is drawn, it is indicated with a X drawn in phantom. On day one, as illustrated in FIG. 9, the processor 130 draws a jackpot in pool 132*a*. Because the draw was a jackpot, the gaming device processor 130 then makes the next draw from the sum of the outcomes in pools 132*a* and 132*b*. On day two, as illustrated in FIG. 10, processor 130 draws a win from pool 132*a*. On day three, as illustrated in FIG. 11, processor 130 draws a jackpot from pool 132*b*. The gaming device processor 130 then makes the next draw from all of the outcomes included in pools 132*a*, 132*b* and 132*c*.

Figure 12:
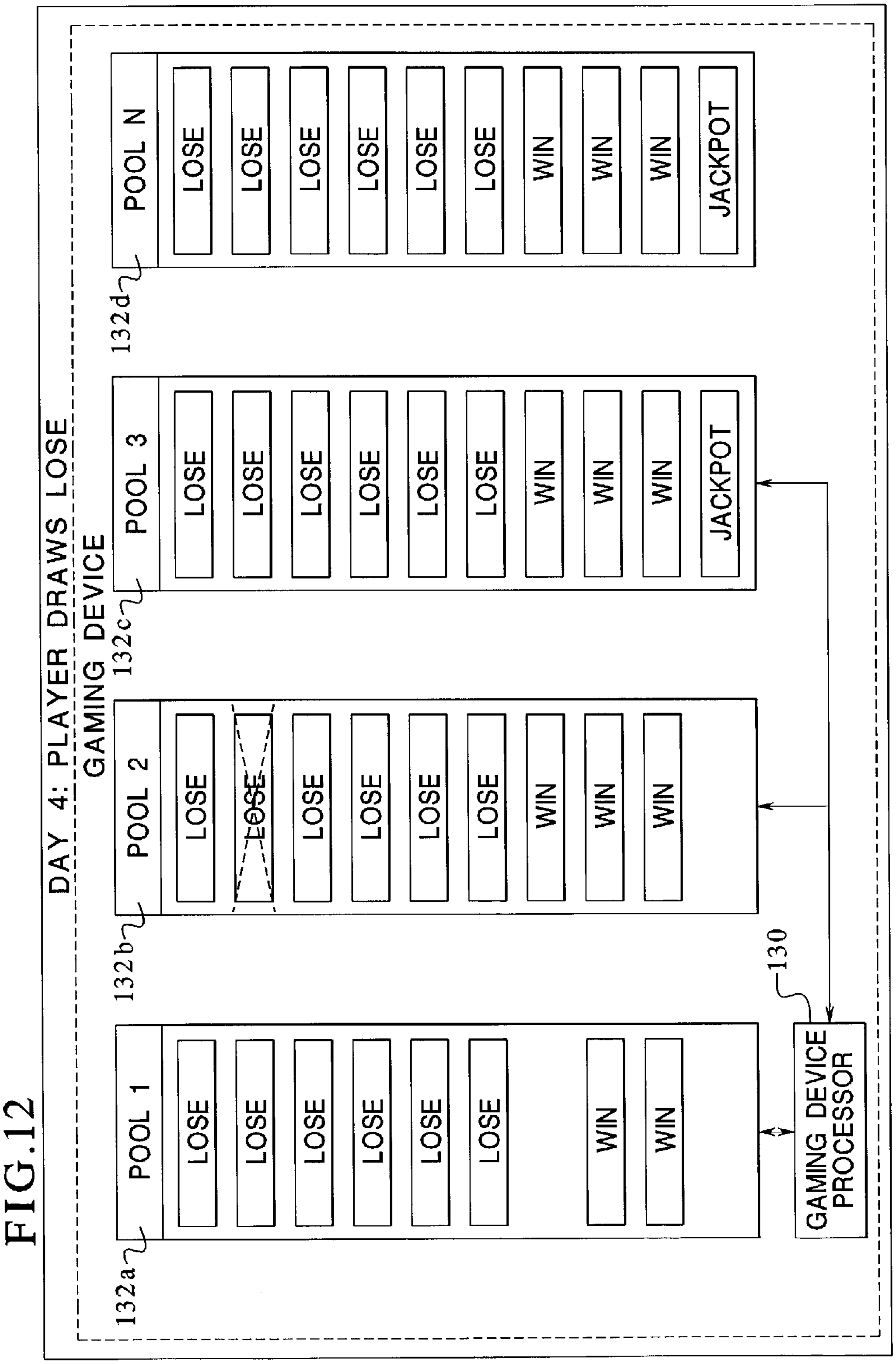
Figure 13:
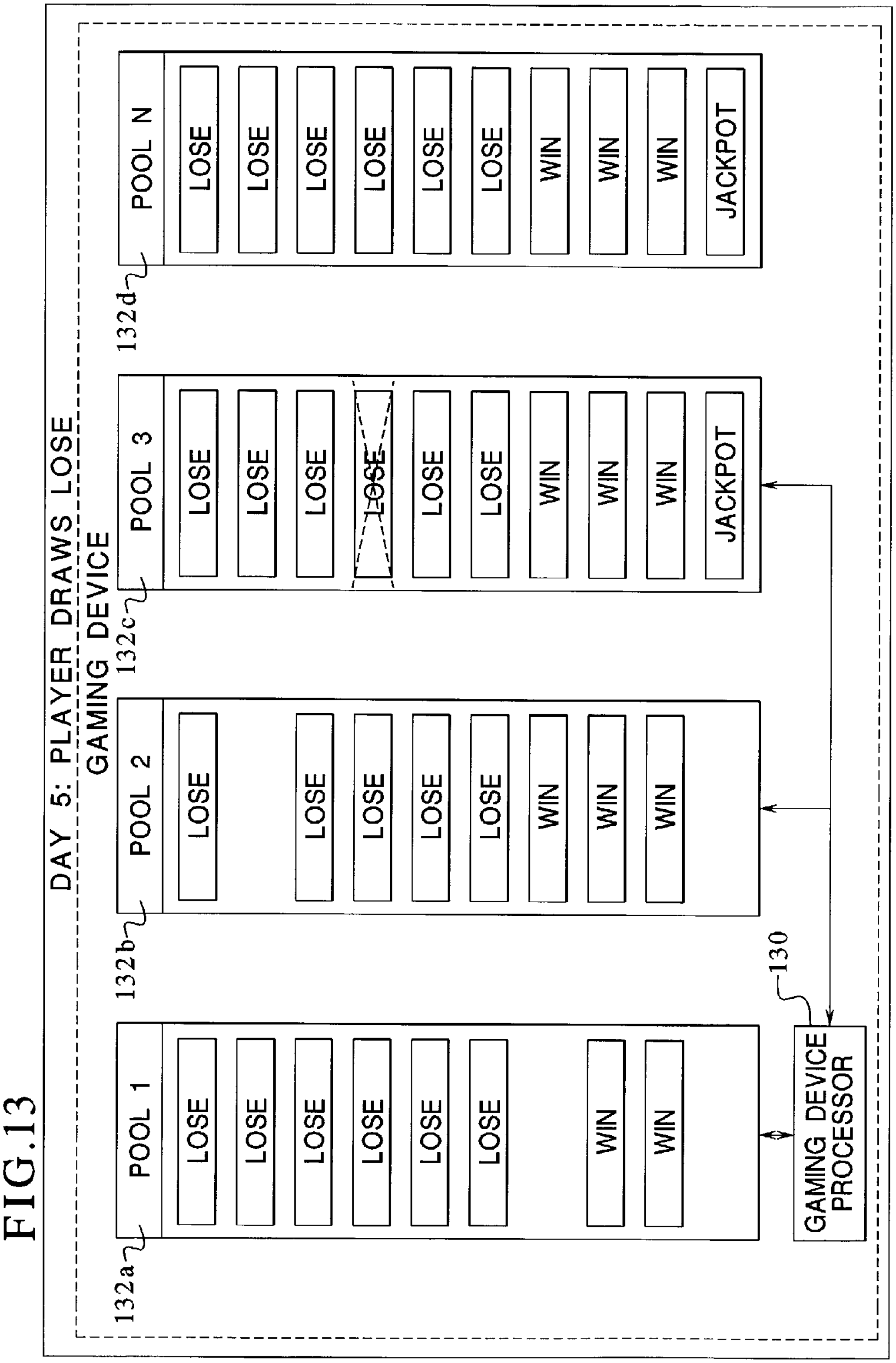
Figure 14:
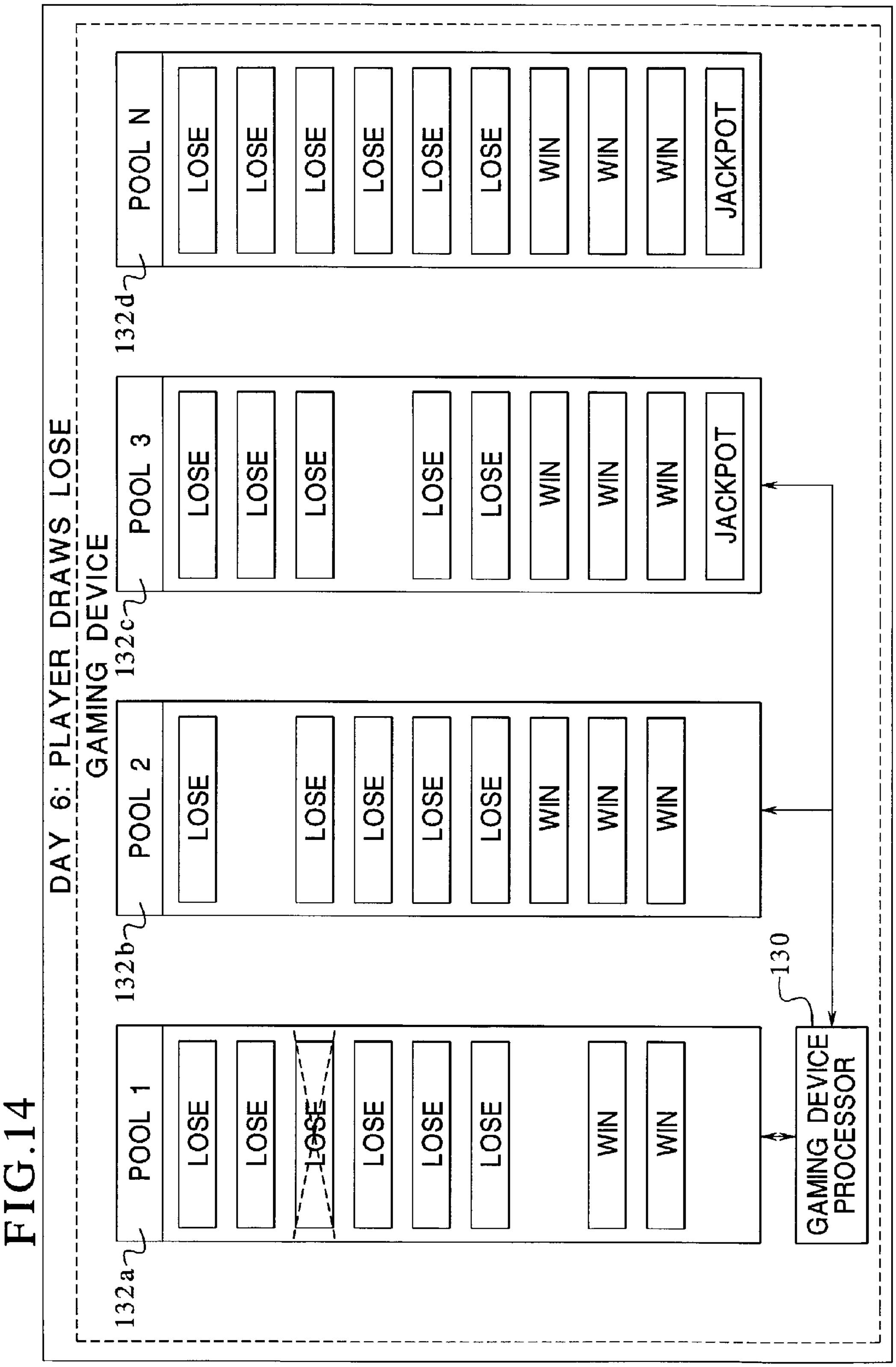
Figure 15:
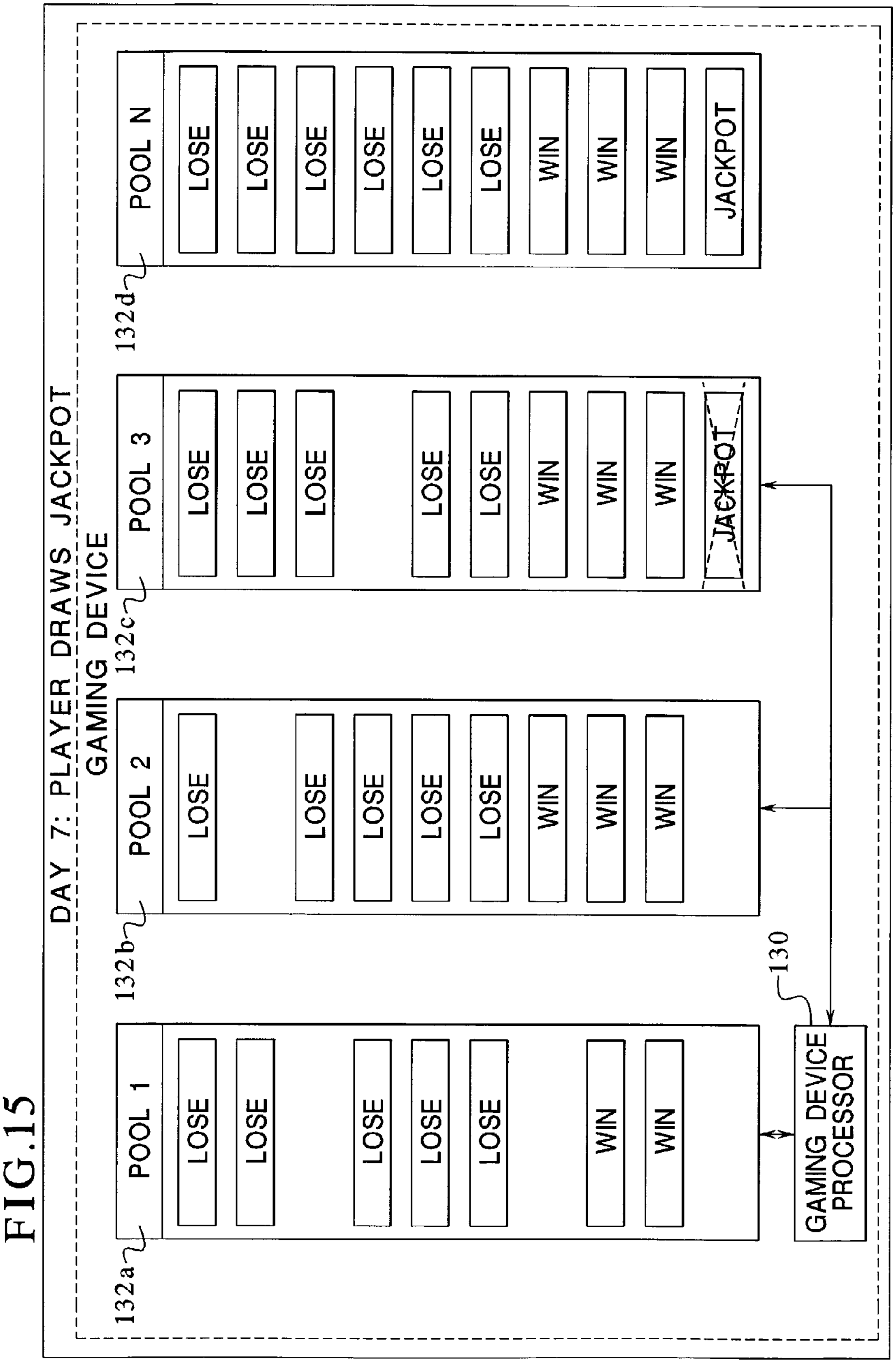
Figure 16:
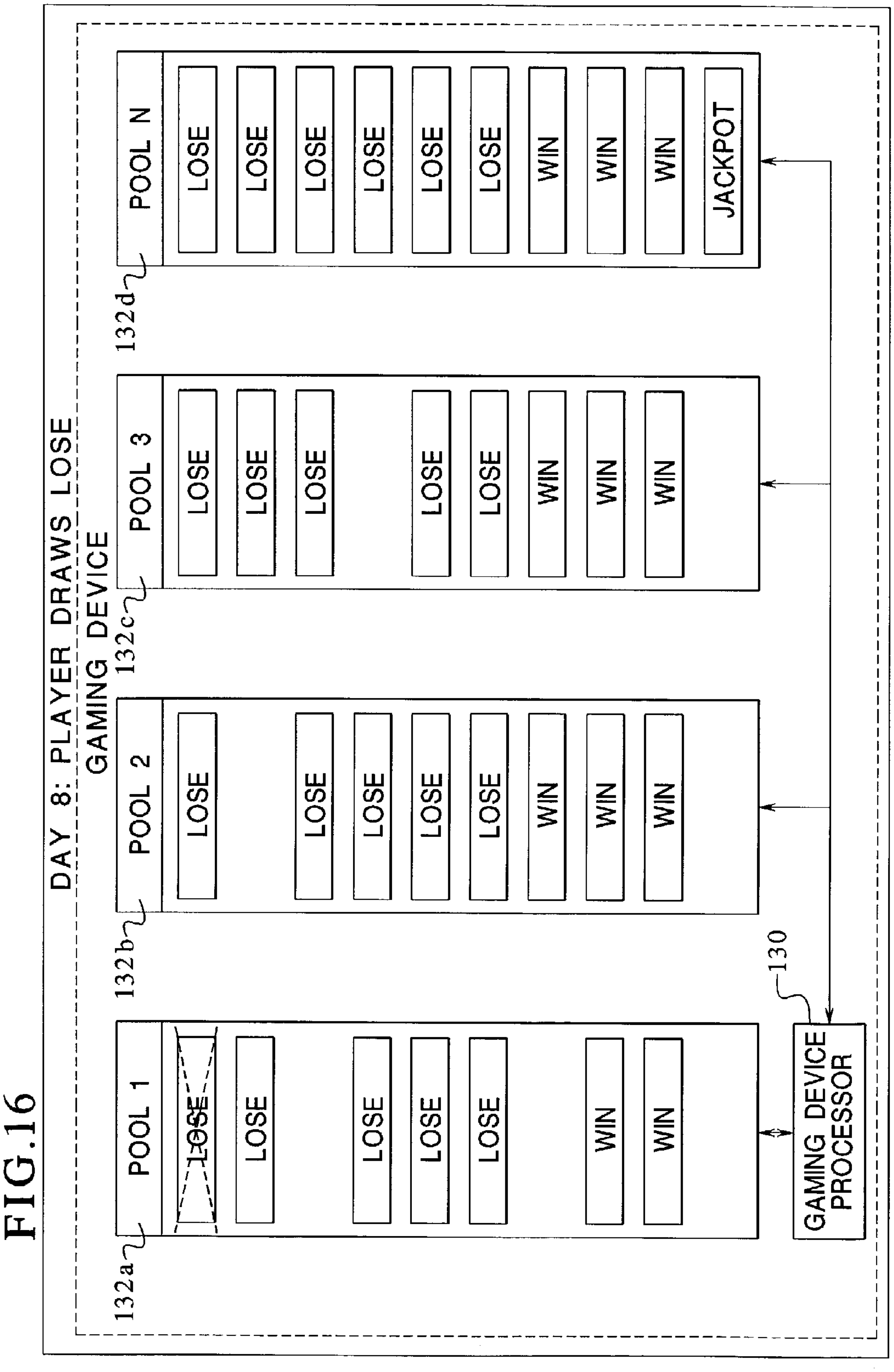

On day four, as illustrated in FIG. 12, processor 130 draws a lose from pool 132*b*. On day five, as illustrated in FIG. 13, processor 130 draws a lose outcome from pool 132*c*. On day six, as illustrated in FIG. 14, processor 130 draws a lose outcome from pool 132*a*. On day seven, as illustrated in FIG. 15, processor 130 draws a jackpot from pool 132*c*. The gaming device processor then makes the next draw from all of the outcomes included in pools 132*a*, 132*b*, 132*c* and 132*d*. On day eight, as illustrated in FIG. 16, processor 130 draws a lose outcome from pool 132*a*. This process continues until all of the outcomes in all of the pools 132*a* through 132*d* are drawn. At that point, the entire process can repeat itself. Although in the context of these examples the gaming device processor controls all draws from the pools, it should be appreciated that the gaming device processor may enable the player to push an input button or use a play activator or other input device which then causes the gaming device processor to make a draw.

Figure 17:
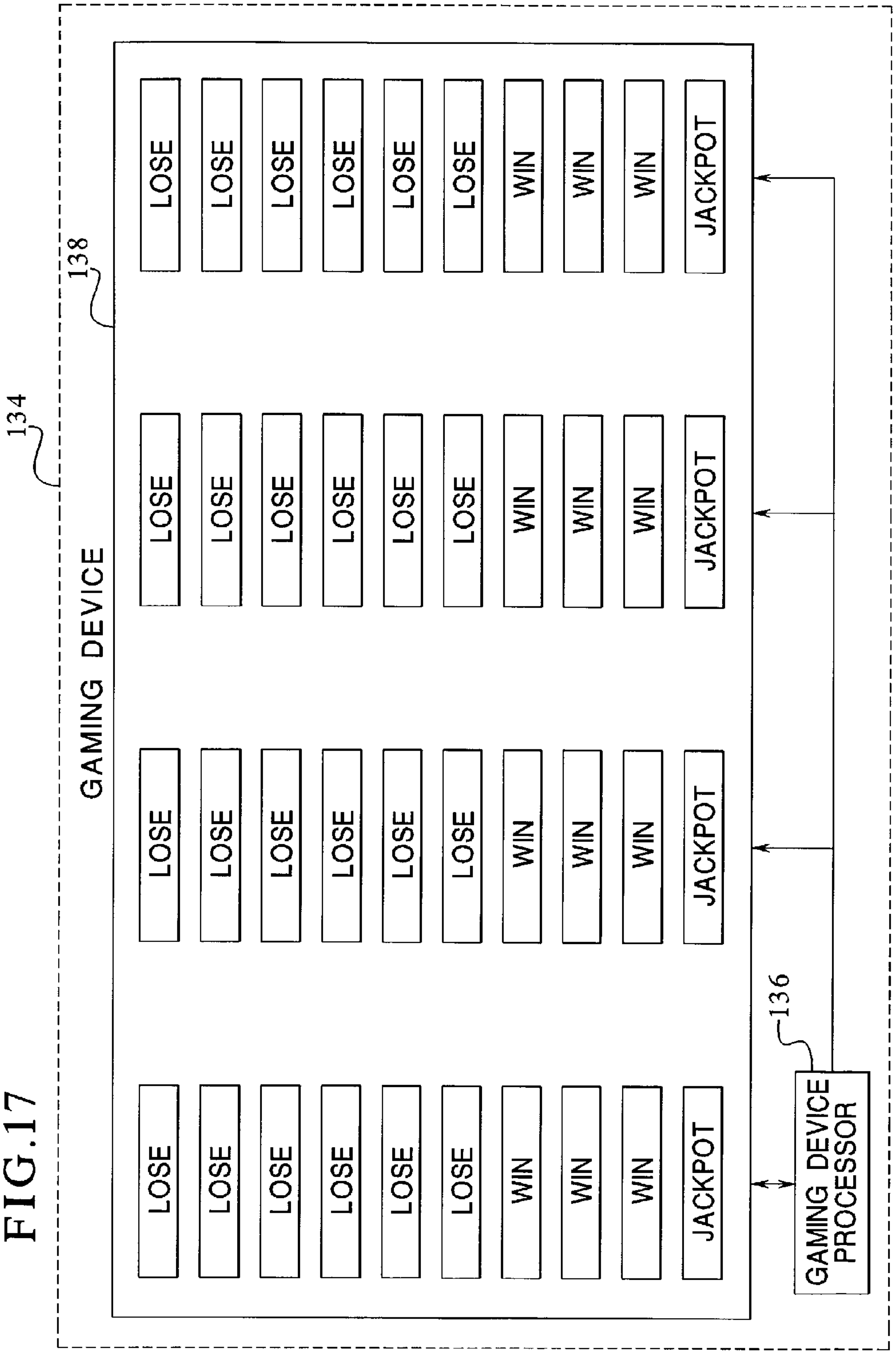
FIG. 17 is a schematic block diagram illustrating the draw-based outcome generator of another embodiment of the gaming device of the present invention.

In an alternative embodiment illustrated in FIG. 17, gaming device 134 includes a gaming device processor 136 in electronic communication with a data storage device (not shown). In this example, the data storage device stores a plurality of outcomes in a single pool 138. The outcomes include lose outcomes, win outcomes and a jackpot outcome. When a predetermined event occurs, the gaming device processor 136 draws one of the outcomes from pool 138. Preferably, prior to making the draw, the gaming device processor randomizes all of the outcomes. Every time the gaming device processor 136 draws an outcome and provides that outcome to a player, the gaming device processor will not provide that outcome to a player again until all of the outcomes in the pool 138 have been drawn and provided to players.

It is preferable that the gaming device of the present invention provides various outcomes over a particular game's entire play cycle by using one or more outcome pools. For example, in a five reel slot machine the available outcomes may include a plurality of combinations of reel symbols, where each combination is associated with a value. The game may include: (a) five sevens associated with ten thousand credits; (b) five bars associated with three hundred credits; (c) three cherries associated with one hundred credits; (d) two bonus symbols associated with two thousand credits; and (e) a plurality of symbols associated with no credits. Each time a player plays the slot machine game, the gaming device processor will use one or more outcome pools to provide the player with a particular outcome, if any.

This process continues from game to game and player to player until the gaming device has provided players with all of the available outcomes, or in other words, until the game's play cycle is complete. For example, if a player makes enough spins, the player will eventually obtain the five sevens and the associated ten thousand credits. It should be appreciated that this type of gaming device can be used to operate any type of computerized game, including, without limitation, slot games, card games, keno games, pull-tab games, bingo games, lottery games, bonus games and any other type of game involving a wager.

In an alternative embodiment of the present invention, the gaming device processor uses one or more outcome pools to determine when to terminate a game and when to continue a game. Here, each outcome pool includes a plurality of termination outcomes and a plurality of game continuation outcomes. In one example, a game displays a plurality of symbols to a player. Certain symbols are associated values and others function as terminators. The game initially does not reveal to a player the values and which symbols are terminators. The game enables a player to select symbols and gain values until reaching a terminator. Each time a player makes a selection, the gaming device processor draws an outcome from one of the outcome pools. The processor provides the outcome (value or termination event) to the player. The processor will not provide that outcome to any player again until all of the outcomes in the drawn outcome's pool have been provide to players.

The gaming device of the present invention includes one or more outcome pools which enables the gaming device processor to provide players with definitive outcomes. Each outcome pool includes a plurality of different types of outcomes. When the gaming device processor draws an outcome and provides it to a player, the gaming device processor will not provide that outcome to a player again until all of the outcomes in that pool have been drawn. In effect, the gaming device processor removes drawn outcomes from the pool until all the outcomes have been drawn. This type of gaming device enables game developers to develop games which provide players with a predetermined number of awards of a predetermined type. Accordingly, this gaming device provides players with an assurance or guarantee that a game will provide certain awards over a play cycle, thereby increasing the enthusiasm and excitement experienced by gaming device players. It should also be appreciated that the play cycle will be continuous if new pools are regularly added to the current pools upon the occurrence of the predetermined conditions as described above.

It should be appreciated that the present invention could be employed through a data network by a central management system such as the system described in U.S. Pat. No. 6,419,583B1 which issued on Jul. 16, 2002. The present invention could also be employed using the system and inventions described in U.S. patent application Ser. No. 09/519,947, filed Mar. 7, 2000 and entitled "Gaming System with Individualized Centrally Generated Random Number Generator Seeds" which is incorporated herein by reference.

It should further be appreciated that the present invention contemplates a suitable tracking system for tracking which pools or pool number the awards or results are generated from and a specific record of the wins generated from each pool. Preferably, the information is maintained internally and not displayed by the gaming device. The information or data may be stored in the memory or storage device and retrieved at a subsequent point in time. It should also be appreciated that this information or data may be sent to a control system (see above) for monitoring and analysis.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operable under control of at least one processor, said gaming device comprising:

at least one display device adapted to display a game;

at least one input device; and at least one data storage device operable to store a plurality of pools of predetermined game outcomes;

said at least one processor programmed to communicate with at least one memory device which stores a plurality of instructions, wherein upon initiation of a play of said game, said instructions are executable by the at least one processor to cause the at least one processor to operate with the at least one display device, the at least one data storage device, and the at least one input device to:

(a) select one of the pools to be in a set of pools;

(b) draw one of the predetermined game outcomes from the selected pool;

(c) provide the drawn predetermined game outcome to the player, wherein each drawn predetermined game outcome is prevented from being provided again to any player until all of the predetermined game outcomes in the selected pools have been drawn;

(d) repeat (b) to (c) until a predetermined event occurs; and (e) following the occurrence of the predetermined event, select at least another one of the pools to be in the set of pools for at least one subsequent play of the game, wherein the predetermined event is the selected pool includes a number of remaining predetermined game outcomes greater than one and less than a predetermined number and for said at least one subsequent play of the game, one of the predetermined game outcomes is drawn from any one of the selected pools in the set of pools with at least one available predetermined game outcome in said pool.

2. A gaming device comprising:

a data storage device configured to store a plurality of pools of predetermined game outcomes;

at least one display device;

at least one input device;

at least one processor; and at least one memory device which stores a plurality of instructions, which when executed by the at least one processor, cause the at least one processor to operate with the at least one display device, the at least one input device and data storage device to:

(a) select one of the stored pools of predetermined game outcomes to be in a set of pools;

(b) for a play of a game:

(i) draw one of the predetermined game outcomes from the selected pool, and (ii) display and provide the drawn predetermined game outcome to a player;

(c) prevent said drawn predetermined game outcome from being provided again to any player until all of the predetermined game outcomes in the selected pool have been drawn;

(d) repeat (b) to (c) until a predetermined event occurs; and (e) following the occurrence of the predetermined event, select at least another one of the pools to be in the set of pools for at least one subsequent play of the game, wherein for said at least one subsequent play of the game, any one of the selected pools in the set of pools with at least one predetermined game outcome in said pool is available to draw one of the predetermined game outcomes from and the predetermined event is selected from the group consisting of:

(i) a first predetermined number of the predetermined game outcomes is drawn from the selected pool, wherein said first predetermined number of drawn predetermined game outcomes is less than all of the predetermined game outcomes in the selected pool, and (ii) the selected pool includes a number of remaining predetermined game outcomes greater than one and less than a second predetermined number.

3. The gaming device of claim 2, wherein the predetermined game outcome include at least one value.

4. The gaming device of claim 2, wherein a plurality of the predetermined game outcomes are values.

5. The gaming device of claim 4, wherein each of the pools includes a plurality of value levels.

6. The gaming device of claim 5, which includes a zero credit value level.

7. The gaming device of claim 5, which includes a predetermined credit value level.

8. The gaming device of claim 5, which includes a predetermined quantity of values at each value level.

9. The gaming device of claim 2, wherein the predetermined game outcomes include at least one opportunity to obtain a value.

10. The gaming device of claim 2, wherein the predetermined game outcomes include at least one decrease in an opportunity to obtain a value.

11. The gaming device of claim 2, wherein the predetermined game outcomes include at least one value of zero credits.

12. The gaming device of claim 2, wherein the predetermined game outcomes include at least one value loss.

13. The gaming device of claim 2, wherein when executed by the at least one processor, the plurality of instructions cause the at least one processor to randomly select one of the pools to draw from.

14. The gaming device of claim 2, wherein when executed by the at least one processor, the plurality of instructions cause the at least one processor to select the pools in a predetermined order.

15. The gaming device of 2, wherein when executed by the at least one processor, the plurality of instructions cause the at least one processor to randomly draw the predetermined game outcomes.

16. The gaming device of claim 2, wherein when executed by the at least one processor, the plurality of instructions cause the at least one processor to draw the predetermined game outcomes in a predetermined order.

17. The gaming device of claim 2, wherein at least two of the pools are identical.

18. The gaming device of claim 2, wherein when executed by the at least one processor, the plurality of instructions cause the at least one processor to select said at least another one of the pools to be in the set of pools for said at least one subsequent play of the game if a designated predetermined game outcome is drawn.

19. The gaming device of claim 18, wherein the predetermined designated outcome is a rare outcome.

20. A gaming device comprising:

a data storage device configured to store a plurality of pools of predetermined game outcomes;

at least one display device;

at least one input device;

at least one processor; and at least one memory device which stores a plurality of instructions, which when executed by the at least one processor following at least one event associated with a game, cause the at least one processor to operate with the at least one display device, the at least one input device and data storage device to:

(a) select a plurality of said pools to be in a set of pools;

(b) for a plurality of plays of a game until a predetermined event occurs:

(i) draw a plurality of said predetermined game outcomes from the selected pools in the set of pools, (ii) display and provide the drawn predetermined game outcomes to at least one player, and (iii) prevent each drawn predetermined game outcome from being provided again to any player until all of the predetermined game outcomes in the selected pools have been drawn; and (c) following the occurrence of the predetermined event, select at least another one of the pools to be in the set of pools for at least one subsequent play of the game, wherein for said at least one subsequent play of the game, any one of the selected pools in the set of pools with at least one predetermined game outcome in said pool is available to draw one of the predetermined game outcomes from and the predetermined event is selected from the group consisting of:

(i) a predetermined number of the predetermined game outcomes is drawn from the selected pools in the set of pools, wherein said predetermined number of drawn predetermined game outcomes is less than all of the predetermined game outcomes in the selected pools, and (ii) the selected pools in the set of pools includes a number of remaining predetermined game outcomes greater than one and less than a second predetermined number.

21. The gaming device of claim 20, wherein at least two of the pools are identical.

22. The gaming device of claim 20, wherein when executed by the at least one processor, the plurality of instructions cause the at least one processor to select said at least another one of the pools to be in the set of pools for said at least one subsequent play of the game if a designated predetermined game outcome is drawn.

23. The gaming device of claim 22, wherein the predetermined designated outcome is a rare outcome.

24. A gaming device comprising:

a data storage device configured to store a plurality of pools of predetermined game outcomes;

at least one display device;

at least one input device;

at least one processor; and at least one memory device which stores a plurality of instructions, which when executed by the at least one processor, cause the at least one processor to operate with the at least one display device, the at least one input device and data storage device to, without performing a probability calculation:

(a) select one of the pools to be in a set of pools;

(b) for a play of a game:

(i) draw at least one of the predetermined game outcomes from the selected pool, and (ii) display and provide the drawn predetermined game outcome to a player;

(c) prevent the drawn predetermined game outcome from being provided again to any player until all of the predetermined game outcomes in the selected pool have been provided;

(d) repeat (b) to (c) until a predetermined event occurs;

(e) following the occurrence of the predetermined event, selecting at least another one of the pools to be in the set of pools for at least one subsequent play of the game, wherein the predetermined event is selected from the group consisting of:

(i) a predetermined number of the predetermined game outcomes is drawn from the selected pool, wherein said predetermined number of drawn predetermined game outcomes is less than all of the predetermined game outcomes in the selected pool, and (ii) the selected pool includes a number of remaining predetermined game outcomes greater than one and less than a second predetermined number; and (f) for the subsequent play of the game:

(i) draw at least one of the predetermined game outcomes from any one of the selected pools in the set of pools with at least one predetermined game outcome in said pool, and (ii) display and provide said drawn predetermined game outcome.

25. The gaming device of claim 24, wherein at least two of the pools are identical.

26. The gaming device of claim 24, wherein when executed by the at least one processor, the plurality of instructions cause the at least one processor to select said at least another one of the pools to be in the set of pools for said at least one subsequent play of the game if a designated predetermined game outcome is drawn.

27. The gaming device of claim 26, wherein the predetermined designated outcome is a rare outcome.

28. A gaming device comprising:

a data storage device configured to store a plurality of pools, wherein a plurality of predetermined values are included in each of the pools, and at least one game symbol is associated with each of the predetermined values;

at least one display device;

at least one input device;

at least one processor; and at least one memory device which stores a plurality of instructions, which when executed by the at least one processor, cause the at least one processor to operate with the at least one display device, the at least one input device and data storage device to:

(a) initiate a game upon a wager by a player;

(b) receive a signal from the at least one input device;

(c) select one of the pools to be in a set of pools;

(d) draw at least one of the predetermined values from the selected pool;

(e) display the game symbol associated with the drawn predetermined value;

(f) display and provide the drawn predetermined value to the player;

(g) prevent the drawn predetermined value from being provided again to any player until all of the predetermined values in the selected pool have been provided;

(h) repeat (d) to (g) until a predetermined event occurs;

(i) following the occurrence of the predetermined event, select at least another one of the pools to be in the set of pools for at least one subsequent play of the game, wherein for said at least one subsequent play of the game, any one of the selected pools in the set of pools with at least one predetermined value in said pool is available to draw one of the predetermined values from and the predetermined event is selected from the group consisting of:

(i) a predetermined number of the predetermined values is drawn from the selected pool, wherein said predetermined number of drawn values is less than all of the values in the selected pool, and (ii) the selected pool includes a number of remaining values greater than one and less than a second predetermined number; and (j) terminate the game.

29. The gaming device of claim 28, wherein when executed by the at least one processor, the plurality of instructions cause the at least one processor to randomly select one of the pools.

30. The gaming device of claim 28, wherein when executed by the at least one processor, the plurality of instructions cause the at least one processor to select the pools in a predetermined sequence.

31. The gaming device of claim 28, wherein when executed by the at least one processor, the plurality of instructions cause the at least one processor to prevent the drawn predetermined value from being provided again to any player until all of the predetermined values in a plurality of the pools have been provided.

32. The gaming device of claim 28, wherein when executed by the at least one processor, the plurality of instructions cause the at least one processor to prevent the drawn predetermined value from being provided again to any player until all of the predetermined values in all of the pools have been provided.

33. The gaming device of claim 28, wherein each of the pools includes a plurality of value levels.

34. The gaming device of claim 33, which includes a predetermined quantity of values at each value level.

35. The gaming device of claim 33, which includes a zero credit value level.

36. The gaming device of claim 28, wherein at least two of the pools are identical.

37. The gaming device of claim 28, wherein when executed by the at least one processor, the plurality of instructions cause the at least one processor to select said at least another one of the pools to be in the set of pools for said at least one subsequent play of the game if a designated predetermined value is drawn.

38. The gaming device of claim 37, wherein the designated predetermined value is a rare value.

39. A gaming device comprising:

a data storage device configured to store a plurality of pools of predetermined awards, wherein a plurality of different award types are included in each of the pools and a plurality of predetermined quantities of the awards are associated with each award type;

at least one display device;

at least one input device;

at least one processor; and at least one memory device which stores a plurality of instructions, which when executed by the at least one processor, cause the at least one processor to operate with the at least one display device, the at least one input device and data storage device to:

(a) select one of the pools to be in a set of pools;
(b) for a play of a game:
(i) draw at least one of the predetermined awards from the selected pool, and
(ii) display and provide the drawn predetermined award to a player,
(c) prevent the drawn predetermined award from being provided again to any player until all of the predetermined awards in all of the pools have been provided;
(d) repeat (b) to (c) until a predetermined event occurs;
(e) following the occurrence of the predetermined event, select at least another one of the pools to be in the set of pools for at least one subsequent play of the game, wherein the predetermined event is selected from the group consisting of:
(i) a first predetermined number of the predetermined awards is drawn from the selected pool, wherein said first predetermined number of drawn predetermined awards is less than all of the predetermined awards in the selected pool, and
(ii) the selected pool includes a number of remaining predetermined awards greater than one and less than a second predetermined number; and
(f) for said at least one subsequent play of the game:
(i) draw at least one of the predetermined awards from any one of the selected pools in the set of pools with at least one predetermined award in said pool, and
(ii) display and provide the drawn predetermined award.

40. The gaming device of claim 39, wherein at least two of the pools are identical.

41. The gaming device of claim 39, wherein when executed by the at least one processor, the plurality of instructions cause the at least one processor to select said at least another one of the pools to be in the set of pools for said subsequent play of the game if a designated predetermined award is drawn.

42. The gaming device of claim 41, wherein the designated predetermined award is a rare award.

43. A gaming device comprising:
a data storage device configured to store a plurality of pools of predetermined game outcomes;
at least one display device;
at least one input device;
at least one processor; and
at least one memory device which stores a plurality of instructions, which when executed by the at least one processor, cause the at least one processor to operate with the at least one display device, the at least one input device and data storage device to:
(a) select one of the pools to be in a set of pools;
(b) for a play of a game:
(i) draw one of the predetermined game outcomes from the selected pool, and
(ii) display and provide the drawn predetermined game outcome to a player;
(c) prevent the drawn predetermined game outcome from being drawn again until all of the predetermined game outcomes in the selected pool have been drawn;
(d) repeat steps (b) through (c) until a predetermined event occurs, wherein the predetermined event is selected from the group consisting of:
(i) a first predetermined number of the predetermined game outcomes is drawn from the selected pool, wherein said first predetermined number of drawn predetermined game outcomes is less than all of the predetermined game outcomes in the selected pool, and
(ii) the selected pool includes a number of remaining predetermined game outcomes greater than one and less than a second predetermined number; and
(e) following the occurrence of the predetermined event, select at least another one of the pools to be in the set of pools for at least a subsequent play of the game, wherein for said at least one subsequent play of the game, one of the predetermined game outcomes is drawn from any one of the selected pools in the set of pools with at least one available predetermined game outcome in said pool.

44. The gaming device of claim 43, wherein at least two of the pools are identical.

45. The gaming device of claim 43, wherein when executed by the at least one processor, the plurality of instructions cause the at least one processor to select said at least another one of the pools to be in the set of pools for said at least one subsequent play of the game if a designated predetermined game outcome is drawn.

46. The gaming device of claim 45, wherein the predetermined designated outcome is a rare outcome.

47. A gaming device comprising:
at least one data storage device configured to store a plurality of pools of predetermined game outcomes, wherein each of the pools includes at least one rare outcome and a plurality of other predetermined game outcomes;
at least one display device;
at least one input device;
at least one processor; and
at least one memory device which stores a plurality of instructions, which when executed by the at least one processor, cause the at least one processor to operate with the at least one display device, the at least one input device and data storage device to:
(a) select a first one of the pools to be in a set of pools after a predetermined event occurs;
(b) for a play of a game:
(i) draw one of the predetermined game outcomes from the selected first one of the pools,
(ii) display and provide the drawn predetermined game outcome to a player, and
(iii) prevent the drawn predetermined game outcome from being drawn again;
(c) repeat steps (b) through (c) until a rare outcome in the selected first one of the pools is drawn and: (i) at least a first predetermined number of said other predetermined game outcomes is drawn from the first one of the pools, wherein said first predetermined number of drawn predetermined game outcomes is less than all of the predetermined game outcomes in the first one of the pools, or (ii) the first one of the pools includes a number of remaining other predetermined game outcomes greater than one and less than a second predetermined number;
(d) select a different one of the pools to be in the set of pools for at least one subsequent play of the game;
(e) for the subsequent play of the game:
(i) draw one of the predetermined game outcomes from one of the pools in the set of pools, wherein for said at least one subsequent play of the game, one of the predetermined game outcomes is drawn from any one of the selected pools in the set of pools with at least one available predetermined game outcome in said pool, (ii) display and provide the drawn predetermined game outcome to the player, and (iii) prevent the drawn predetermined game outcome from being drawn again; and (f) repeat steps (e) until a rare outcome in the selected different one of the pools is drawn and: (i) at least a third predetermined number of said other predetermined game outcomes is drawn in the different one of the pools, or (ii) the different one of the pools includes a number of remaining other predetermined game outcomes greater than one and less than a fourth predetermined number.

48. The gaming device of claim 47, wherein at least two of the pools are identical.

49. A gaming device comprising:

a data storage device configured to store a plurality of pools of predetermined game outcomes, wherein each of said pools includes at least one termination outcome and a plurality of continuation outcomes;

at least one display device;

at least one input device;

at least one processor; and at least one memory device which stores a plurality of instructions, which when executed by the at least one processor, cause the at least one processor to operate with the at least one display device, the at least one input device and data storage device to:

(a) for a play of a game:

(i) draw said termination outcome or one of the continuation outcomes from a selected one of the pools in a set of pools, and (ii) display and provide the drawn outcome to a player;

(b) prevent the drawn outcome from being provided again to any player until all of the outcomes in said selected one of the pools have been drawn and provided;

(c) repeat (a) to (b) until a predetermined event occurs; and (d) following the occurrence of the predetermined event, select at least another one of the pools to be in the set of pools for at least one subsequent play of the game, wherein for said at least one subsequent play of the game, any one of the selected pools in the set of pools with at least one predetermined game outcome in said pool is available to draw one of the predetermined game outcomes from and the predetermined event is selected from the group consisting of:

(i) a predetermined number of the predetermined game outcomes is drawn from one of the pools, wherein said predetermined number of drawn predetermined game outcomes is less than all of the predetermined game outcomes in said pool, and (ii) said pool includes a number of remaining predetermined game outcomes greater than one and less than a second predetermined number.

50. The gaming device of claim 49, wherein at least one of the continuation outcomes includes a predetermined value.

51. The gaming device of claim 49, wherein when executed by the at least one processor, the plurality of instructions cause the at least one processor to select said at least another one of the pools to be in the set of pools for said at least one subsequent play of the game if a designated predetermined game outcome is drawn.

52. The gaming device of claim 51, wherein the predetermined designated outcome is a rare outcome.

53. A gaming device comprising:

a data storage device configured to store a plurality of pools of predetermined game outcomes, wherein each of said pools includes at least one termination outcome and a plurality of value outcomes;

at least one display device;

at least one input device;

at least one processor; and at least one memory device which stores a plurality of instructions, which when executed by the at least one processor, cause the at least one processor to operate with the at least one display device, the at least one input device and data storage device to:

(a) for a play of a game:

(i) receive a signal following a player's selection of one of a plurality of symbols, (ii) draw said termination outcome or one of the value outcomes from a selected one of the pools in a set of pools, and (iii) provide the drawn termination outcome or value outcome to the player;

(b) prevent the drawn termination outcome or value outcome from being provided again to any player until all of the outcomes in said selected one of the pools have been drawn and provided;

(c) repeat (a) to (b) until a predetermined event occurs; and (d) following the occurrence of the predetermined event, select at least another one of the pools to be in the set of pools for at least one subsequent play of the game, wherein for said at least one subsequent play of the game, any one of the selected pools in the set of pools with at least one predetermined game outcome in said pool is available to draw one of the predetermined game outcomes from and the predetermined event is selected from the group consisting of:

(i) a predetermined number of the predetermined game outcomes is drawn from one of the pools, wherein said predetermined number of drawn predetermined game outcomes is less than all of the predetermined game outcomes in said pool, and (ii) said pool includes a number of remaining predetermined game outcomes greater than one and less than a second predetermined number.

54. The gaming device of claim 53, wherein when executed by the at least one processor, the plurality of instructions cause the at least one processor to select said at least another one of the pools to be in the set of pools for said at least one subsequent play of the game if a designated predetermined game outcome is drawn.

55. A gaming device comprising:

a data storage device;

at least one display device;

at least one input device;

at least one processor; and at least one memory device which stores a plurality of instructions, which when executed by the at least one processor, cause the at least one processor to operate with the at least one display device, the at least one input device and data storage device to:

(a) generate a first pool of predetermined game outcomes to be in a set of pools;

(b) store the generated first pool of predetermined game outcomes;

(c) for a play of a game:

(i) draw one of the predetermined game outcomes from the first pool, and (ii) display and provide the drawn predetermined game outcome to a player;

(d) generate a second pool of predetermined game outcomes to be in the set of pools following a predetermined event, wherein the predetermined event is selected from the group consisting of:

(i) a first predetermined number of the predetermined game outcomes is drawn from the first pool, wherein said first predetermined number of drawn predetermined game outcomes is less than all of the predetermined game outcomes in the first pool, and (ii) the first pool includes a number of remaining predetermined game outcomes greater than one and less than a second predetermined number;

(e) store the generated second pool of predetermined game outcomes; and (f) for a second play of the game:

(i) draw one of the predetermined game outcomes from the first pool or the second pool, and (ii) prevent each drawn predetermined game outcome from being provided again to any player until all of the outcomes are drawn from the pool which included the drawn outcome.

56. The gaming device of claim 55, wherein the predetermined event is the drawing of a designated predetermined outcome.

57. The gaming device of claim 55, wherein when executed by the at least one processor, the plurality of instructions cause the at least one processor to prevent each drawn predetermined game outcome from being provided again to any player all of the predetermined game outcomes are drawn from the first pool and the second pool.

58. The gaming device of claim 55, wherein a plurality of the predetermined game outcomes are value outcomes.

59. The gaming device of claim 58, wherein the predetermined event is the drawing of a predetermined value outcome.

60. A gaming device comprising:

a data storage device;

at least one display device;

at least one input device;

at least one processor; and at least one memory device which stores a plurality of instructions, which when executed by the at least one processor, cause the at least one processor to operate with the at least one display device, the at least one input device and data storage device to:

(a) generate a plurality of pools of predetermined game outcomes, one at a time, while the gaming device is in service;

(b) after each pool is generated, store each generated pool of predetermined game outcomes;

(c) for a play of a game:

(i) draw one of the predetermined game outcomes from a selected one of the stored pools in a set of pools, and (ii) display and provide the drawn predetermined game outcome to a player;

(d) prevent each drawn predetermined game outcome from being provided again to any player until all of the predetermined game outcomes are drawn from the selected one of the pools;

(e) repeat (c) to (d) until a predetermined event occurs; and (f) following the occurrence of the predetermined event, select at least another one of the pools to be in the set of pools for at least one subsequent play of the game, wherein for said at least one subsequent play of the game, any one of the selected pools in the set of pools with at least one predetermined game outcome in said pool is available to draw one of the predetermined game outcomes from and the predetermined event is selected from the group consisting of:

(i) a first predetermined number of the predetermined game outcomes is drawn from the stored pool which included the drawn outcome, wherein said first predetermined number of drawn predetermined game outcomes is less than all of the predetermined game outcomes in the stored pool which included the drawn outcome, and (ii) the pool which included the drawn outcome includes a number of remaining predetermined game outcomes greater than one and less than a second predetermined number.

61. The gaming device of claim 60, wherein when executed by the at least one processor, the plurality of instructions cause the at least one processor to select said at least another one of the pools to be in the set of pools for said at least one subsequent play of the game if a designated predetermined game outcome is drawn.

62. The gaming device of claim 61, wherein the predetermined designated outcome is a rare outcome.

63. A method of operating a gaming device including a plurality of instructions, said method comprising the steps of:

(a) causing a data storage device to store a plurality of pools, wherein, different types of predetermined game outcomes are in the pools;

(b) providing a player with an opportunity to obtain at least one of the outcomes;

(c) causing a processor to execute said plurality of instructions to draw one of the predetermined game outcomes from a selected one of the pools in a set of pools;

(d) causing a display device to display the drawn predetermined game outcome;

(e) providing the drawn predetermined game outcome to the player;

(f) causing the processor to execute said plurality of instructions to prevent the drawn predetermined game outcome from being provided to any players until all of the predetermined game outcomes in said selected one of the pools have been provided;

(g) repeating (b) to (f) until a predetermined event occurs; and (h) following the occurrence of the predetermined event, causing the processor to execute said plurality of instructions to select at least another one of the pools to be in the set of pools for at least one subsequent play of the game, wherein for said at least one subsequent play of the game, any one of the selected pools in the set of pools with at least one predetermined game outcome in said selected pool is available to draw one of the predetermined game outcomes from and the predetermined event is selected from the group consisting of:

(i) a first predetermined number of the predetermined game outcomes is drawn from one of the pools, wherein said first number of drawn predetermined game outcomes is less than all of the predetermined game outcomes in said selected pool, and (ii) said selected pool includes a number of remaining predetermined game outcomes greater than one and less than a second predetermined number.

64. The method of claim 63, which includes causing the processor to execute said plurality of instructions to select said at least another one of the pools to be in the set of pools for said at least one subsequent play of the game if a designated predetermined game outcome is drawn.

65. The method of claim 64, wherein the predetermined designated outcome is a rare outcome.

* * * * *